United States Patent
Osawa et al.

(10) Patent No.: US 11,673,376 B2
(45) Date of Patent: Jun. 13, 2023

(54) LAMINATE

(71) Applicant: DAIKIN INDUSTRIES, LTD., Osaka (JP)

(72) Inventors: Kozue Osawa, Osaka (JP); Toshiaki Masui, Osaka (JP); Yuuki Kuwajima, Osaka (JP); Takeshi Inaba, Osaka (JP)

(73) Assignee: DAIKIN INDUSTRIES. LTD., Osaka (JP)

( * ) Notice: Subject to any disclaimer, the term of this patent is extended or adjusted under 35 U.S.C. 154(b) by 664 days.

(21) Appl. No.: 16/470,319

(22) PCT Filed: Dec. 4, 2017

(86) PCT No.: PCT/JP2017/043440
§ 371 (c)(1),
(2) Date: Jun. 17, 2019

(87) PCT Pub. No.: WO2018/123448
PCT Pub. Date: Jul. 5, 2018

(65) Prior Publication Data
US 2019/0344545 A1    Nov. 14, 2019

(30) Foreign Application Priority Data

Dec. 27, 2016 (JP) .............................. JP2016-253499

(51) Int. Cl.
| | |
|---|---|
| B32B 25/14 | (2006.01) |
| B32B 25/08 | (2006.01) |
| B32B 1/08 | (2006.01) |
| C08J 5/18 | (2006.01) |
| C08K 3/04 | (2006.01) |
| C08K 3/32 | (2006.01) |
| F16L 11/04 | (2006.01) |

(52) U.S. Cl.
CPC ................ *B32B 25/08* (2013.01); *B32B 1/08* (2013.01); *B32B 25/14* (2013.01); *C08J 5/18* (2013.01); *C08K 3/04* (2013.01); *C08K 3/32* (2013.01); *B32B 2597/00* (2013.01); *C08J 2327/18* (2013.01); *F16L 11/04* (2013.01)

(58) Field of Classification Search
CPC .......... B32B 7/12; B32B 27/26; B32B 33/00; B32B 27/322; C08K 3/32; C08K 5/14; C08J 5/18
See application file for complete search history.

(56) References Cited

U.S. PATENT DOCUMENTS

| | | | |
|---|---|---|---|
| 5,588,469 A | 12/1996 | Kakiuchi et al. | |
| 10,421,257 B2* | 9/2019 | Kuwajima | ............ B32B 27/322 |
| 2002/0006491 A1 | 1/2002 | Ito et al. | |
| 2003/0194564 A1 | 10/2003 | Araki et al. | |
| 2006/0029811 A1* | 2/2006 | Sugioka | ................ H01L 23/293 |
| | | | 428/413 |
| 2009/0011164 A1 | 1/2009 | Masuda et al. | |
| 2016/0288461 A1 | 10/2016 | Kuwajima et al. | |
| 2017/0043560 A1 | 2/2017 | Kuwajima et al. | |

FOREIGN PATENT DOCUMENTS

| | | |
|---|---|---|
| CN | 101065440 A | 10/2007 |
| JP | 09-157616 A | 6/1997 |
| JP | 11-082822 A | 3/1999 |
| JP | 2932980 B2 | 8/1999 |
| JP | 2002-054768 A | 2/2002 |
| JP | 2010-280103 A | 12/2010 |
| JP | 2015-214145 A | 12/2015 |
| WO | 2015/072491 A1 | 5/2015 |

OTHER PUBLICATIONS

Extended European Search Report dated May 19, 2020, from the European Patent Office in Application No. 17886557.2.
International Search Report of PCT/JP2017/043440 dated Feb. 13, 2018 [PCT/ISA/210].
International Preliminary Report on Patentability dated Jul. 2, 2019, issued by the International Bureau in application No. PCT/JP2017/043440.

\* cited by examiner

*Primary Examiner* — Gregory Listvoyb
(74) *Attorney, Agent, or Firm* — Sughrue Mion, PLLC

(57) ABSTRACT

The invention provides a laminate including a fluoroelastomer layer and a fluororesin layer which are firmly bonded to each other. The laminate includes a fluoroelastomer layer (A) and a fluororesin layer (B) stacked on the fluoroelastomer layer (A). The fluoroelastomer layer (A) is a layer formed from a fluoroelastomer composition. The fluoroelastomer composition contains a fluoroelastomer, a basic multifunctional compound, and at least one compound (a) selected from the group consisting of a fluororesin (a1) and a phosphorus compound (a2). The compound (a) is present in an amount of 0.01 to 120 parts by mass relative to 100 parts by mass of the fluoroelastomer. The fluororesin layer (B) is formed from a fluororesin (b1) having a fuel permeability coefficient of 2.0 g·mm/m²/day or lower.

9 Claims, No Drawings

LAMINATE

CROSS REFERENCE TO RELATED APPLICATIONS

This application is a National Stage of International Application No. PCT/JP2017/043440, filed Dec. 4, 2017, claiming priority to Japanese Patent Application No. 2016-253499, filed Dec. 27, 2016.

TECHNICAL FIELD

The invention relates to laminates.

BACKGROUND ART

A current rise in environmental awareness promotes preparation of legal frameworks for preventing fuel volatilization. In particular, the field of automobiles, mainly in the United States, shows a significant tendency of suppressing fuel volatilization and has an increasing need for materials having excellent fuel barrier properties.

Specifically, laminated hoses including a fluororesin barrier layer (layers other than the barrier layer are rubber layers) for achieving favorably low fuel permeability are used as fuel-transporting rubber hoses. Still, a strong demand for reduction in environmental load causes a demand for much lower fuel permeability.

Fluoroelastomers are excellent in various properties such as heat resistance, oil resistance, and aging resistance, and thus are proposed to be used as rubber material for the layers other than the barrier layer.

Fluororesin, especially a fluororesin having excellently low fuel permeability, unfortunately has difficulty in bonding to the counter materials, i.e., fluoroelastomers of the inner and outer layers, when used for a barrier layer. In response to the above issue, Patent Literature 1 discloses a hose for automobile fuel pipes, including: an inner layer which is a molded article of a ternary fluororesin of tetrafluoroethylene-hexafluoropropylene-vinylidene fluoride; an outer layer which is a vulcanization-molded article of a vulcanizable composition of an epichlorohydrin rubber blended with a 1,8-diazabicyclo(5.4.0)undecene-7 salt and an organic phosphonium salt or a NBR/PVC blend; and an innermost layer which is a vulcanization-molded article of a vulcanizable composition of a NBR-based rubber blended with a 1,8-diazabicyclo(5.4.0)undecene-7 salt and an organic phosphonium salt or a fluoroelastomer, the layers being firmly bonded to each other.

CITATION LIST

Patent Literature

Patent Literature 1: JP 2932980 B

SUMMARY OF INVENTION

Technical Problem

Further improvement is demanded in adhesion between the fluoroelastomer layer and the fluororesin layer.

In view of the above current state of the art, the invention aims to provide a laminate including a fluoroelastomer layer and a fluororesin layer, the fluoroelastomer layer and the fluororesin layer being firmly bonded to each other.

Solution to Problem

The inventors found that the presence of a basic multifunctional compound and at least one of a fluororesin (a1) or a phosphorus compound (a2) in the fluoroelastomer layer allows firm bonding of the fluororesin layer and the fluoroelastomer layer even when the fluororesin layer is formed from a fluororesin having a low fuel permeability coefficient. Thereby, the inventors completed the invention.

Specifically, the invention relates to a laminate including:
a fluoroelastomer layer (A); and
a fluororesin layer (B) stacked on the fluoroelastomer layer (A),
the fluoroelastomer layer (A) being a layer formed from a fluoroelastomer composition,
the fluoroelastomer composition containing a fluoroelastomer, a basic multifunctional compound, and at least one compound (a) selected from the group consisting of a fluororesin (a1) and a phosphorus compound (a2), the compound (a) being present in an amount of 0.01 to 120 parts by mass relative to 100 parts by mass of the fluoroelastomer,
the fluororesin layer (B) being formed from a fluororesin (b1) having a fuel permeability coefficient of 2.0 g·mm/m$^2$/day or lower.

The fluororesin (a1) is preferably at least one selected from the group consisting of non melt-processible polytetrafluoroethylene, low molecular weight polytetrafluoroethylene, a tetrafluoroethylene/perfluoro(alkyl vinyl ether) copolymer, a tetrafluoroethylene/hexafluoropropylene copolymer, an ethylene/tetrafluoroethylene copolymer, an ethylene/tetrafluoroethylene/hexafluoropropylene copolymer, polychlorotrifluoroethylene, a chlorotrifluoroethylene/tetrafluoroethylene copolymer, an ethylene/chlorotrifluoroethylene copolymer, polyvinyl fluoride, and a fluoromonomer/vinyl ester copolymer.

The phosphorus compound (a2) is preferably a phosphine.

The phosphorus compound (a2) is preferably a phosphine compound represented by PR$_3$, wherein three Rs are the same as or different from each other, and are each a halogen atom or an organic group.

The fluoroelastomer composition preferably further contains a peroxide-vulcanizing agent.

The fluororesin (b1) is preferably at least one selected from the group consisting of polychlorotrifluoroethylene, a chlorotrifluoroethylene copolymer, and a tetrafluoroethylene/hexafluoropropylene/vinylidene fluoride copolymer.

In the laminate, the fluoroelastomer layer (A) is preferably stacked on each side of the fluororesin layer (B).

In the laminate, the fluororesin layer (B) is preferably stacked on each side of the fluoroelastomer layer (A).

Preferably, the laminate further includes a non-fluoroelastomer layer (C1a), wherein the layers are stacked in the order of the fluoroelastomer layer (A), the fluororesin layer (B), and the non-fluoroelastomer layer (C1a).

Preferably, the laminate further includes a non-fluoroelastomer layer (D1a), wherein the layers are stacked in the order of: the non-fluoroelastomer layer (D1a), the fluoroelastomer layer (A), the fluororesin layer (B), and the non-fluoroelastomer layer (C1a); the fluoroelastomer layer (A), the fluororesin layer (B), the non-fluoroelastomer layer (D1a), and the non-fluoroelastomer layer (C1a); or the fluoroelastomer layer (A), the fluororesin layer (B), the non-fluoroelastomer layer (C1a), and the non-fluoroelastomer layer (D1a).

In the laminate, the fluoroelastomer layer (A) and the fluororesin layer (B) are preferably vulcanization-bonded to each other.

Advantageous Effect of Invention

The laminate of the invention having any of the above structures satisfies that the fluoroelastomer layer and the fluororesin layer are firmly bonded to each other.

DESCRIPTION OF EMBODIMENTS

The invention will be specifically described hereinbelow.

The laminate of the invention includes a fluoroelastomer layer (A) and a fluororesin layer (B) stacked on the fluoroelastomer layer (A).

The following describes the respective components.
(A) Fluoroelastomer Layer

The fluoroelastomer layer (A) is a layer formed form a fluoroelastomer composition. The fluoroelastomer layer (A) is usually obtainable by molding a fluoroelastomer composition into an unvulcanized fluoroelastomer layer, followed by vulcanization treatment.

The fluoroelastomer composition contains a fluoroelastomer, a basic multifunctional compound, and at least one compound (a) selected from the group consisting of a fluororesin (a1) and a phosphorus compound (a2).
(Fluoroelastomer)

The fluoroelastomer is usually formed from an amorphous polymer containing a fluorine atom binding to a carbon atom constituting the main chain and having rubber elasticity. The fluoroelastomer may contain a single polymer or may contain two or more polymers. The fluoroelastomer usually has no clear melting point.

The fluoroelastomer is preferably at least one selected from the group consisting of a vinylidene fluoride (VdF)/hexafluoropropylene (HFP) copolymer, a VdF/HFP/tetrafluoroethylene (TFE) copolymer, a TFE/propylene copolymer, a TFE/propylene/VdF copolymer, an ethylene/HFP copolymer, an ethylene/HFP/VdF copolymer, an ethylene/HFP/TFE copolymer, a VdF/TFE/perfluoro(alkyl vinyl ether) (PAVE) copolymer, a VdF/chlorotrifluoroethylene (CTFE) copolymer, and a VdF/CH$_2$=CFRf$^3$ (wherein Rf$^3$ is a C1-C12 linear or branched fluoroalkyl group) copolymer. The fluoroelastomer is preferably a non-perfluoro fluoroelastomer, more preferably a copolymer containing a polymerized unit (VdF unit) derived from vinylidene fluoride.

The copolymer containing a VdF unit is preferably a copolymer containing a VdF unit and a copolymerized unit derived from a fluorine-containing ethylenic monomer (other than the VdF unit; hereinafter, also referred to as a "fluorine-containing ethylenic monomer unit (a)"). The copolymer containing a VdF unit may be a copolymer consisting only of a VdF unit and a fluorine-containing ethylenic monomer unit (a), or may be a copolymer containing a copolymerized unit derived from a monomer copolymerizable with VdF and a fluorine-containing ethylenic monomer (other than VdF; hereinafter, also referred to as a "fluorine-containing ethylenic monomer (a)").

The copolymer containing a VdF unit preferably contains 30 to 90 mol % of a VdF unit and 70 to 10 mol % of a fluorine-containing ethylenic monomer unit (a), more preferably 30 to 85 mol % of a VdF unit and 70 to 15 mol % of a fluorine-containing ethylenic monomer unit (a), still more preferably 30 to 80 mol % of a VdF unit and 70 to 20 mol % of a fluorine-containing ethylenic monomer unit (a), relative to 100 mol % in total of the VdF unit and the fluorine-containing ethylenic monomer unit (a).

The copolymerized unit derived from a monomer copolymerizable with VdF and a fluorine-containing ethylenic monomer unit (a) (other than the VdF unit) is preferably present in an amount of 0 to 10 mol % relative to the sum of the amounts of the VdF unit and the copolymerized unit derived from the fluorine-containing ethylenic monomer (a).

Examples of the fluorine-containing ethylenic monomer (a) include fluorine-containing monomers such as TFE, CTFE, trifluoroethylene, HFP, trifluoropropylene, tetrafluoropropylene, pentafluoropropylene, trifluorobutene, tetrafluoroisobutene, PAVE, vinyl fluoride, and fluorovinyl ether represented by the following formula (2):

$$CFX=CXOCF_2OR^1 \qquad (2)$$

wherein Xs are the same as or different from each other, and are each H, F, or CF$_3$; R$^1$ is a C1-C6 linear or branched fluoroalkyl group optionally containing one or two atoms of at least one selected from the group consisting of H, Cl, Br, and I, or a C5-C6 cyclic fluoroalkyl group optionally containing one or two atoms of at least one selected from the group consisting of H, Cl, Br, and I. Preferred among these is at least one selected from the group consisting of a fluorovinyl ether represented by the formula (2), TFE, HFP, and PAVE, more preferred is at least one selected from the group consisting of TFE, HFP, and PAVE.

The PAVE is preferably one represented by the following formula (3):

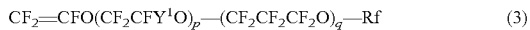

$$CF_2=CFO(CF_2CFY^1O)_p-(CF_2CF_2CF_2O)_q-Rf \qquad (3)$$

wherein Y$^1$ is F or CF$_3$; Rf is a C1-C5 perfluoroalkyl group; p is an integer of 0 to 5; and q is an integer of 0 to 5.

The PAVE is more preferably perfluoro(methyl vinyl ether) or perfluoro(propyl vinyl ether), still more preferably perfluoro(methyl vinyl ether). These may be used alone or in any combination thereof.

Examples of the monomer copolymerizable with VdF and a fluorine-containing ethylenic monomer (a) include ethylene, propylene, and alkyl vinyl ether.

Such a copolymer containing a VdF unit is specifically preferably at least one copolymer selected from the group consisting of a VdF/HFP copolymer, a VdF/HFP/TFE copolymer, a VdF/CTFE copolymer, a VdF/CTFE/TFE copolymer, a VdF/PAVE copolymer, a VdF/TFE/PAVE copolymer, a VdF/HFP/PAVE copolymer, and a VdF/HFP/TFE/PAVE copolymer. In order to achieve good heat resistance, particularly preferred among these copolymers containing a VdF unit is at least one copolymer selected from the group consisting of a VdF/HFP copolymer and a VdF/HFP/TFE copolymer. These copolymers containing a VdF unit preferably satisfy the aforementioned compositional ratio of the VdF unit and the fluorine-containing ethylenic monomer unit (a).

The VdF/HFP copolymer is preferably one satisfying a VdF/HFP ratio by mole of (45 to 85)/(55 to 15), more preferably. (50 to 80)/(50 to 20), still more preferably (60 to 80)/(40 to 20).

The VdF/HFP/TFE copolymer is preferably one satisfying a VdF/HFP/TFE ratio by mole of (30 to 85)/(5 to 50)/(5 to 40), more preferably one satisfying a VdF/HFP/TFE ratio by mole of (35 to 80)/(8 to 45)/(8 to 35), still more preferably one satisfying a VdF/HFP/TFE ratio by mole of (40 to 8.0)/(10 to 40)/(10 to 30), most preferably one satisfying a VdF/HFP/TFE ratio by mole of (40 to 80)/(10 to 35)/(10 to 30).

The VdF/PAVE copolymer is preferably one satisfying a VdF/PAVE ratio by mole of (65 to 90)/(10 to 35).

The VdF/TFE/PAVE copolymer is preferably one satisfying a VdF/TFE/PAVE ratio by mole of (40 to 80)/(3 to 40)/(15 to 35).

The VdF/HFP/PAVE copolymer is preferably one satisfying a VdF/HFP/PAVE ratio by mole of (65 to 90)/(3 to 25)/(3 to 25).

The VdF/HFP/TFE/PAVE copolymer is preferably one satisfying a VdF/HFP/TFE/PAVE ratio by mole of (40 to 90)/(0 to 25)/(0 to 40)/(3 to 35), more preferably (40 to 80)/(3 to 25)/(3 to 40)/(3 to 25).

The fluoroelastomer also preferably contains a copolymer containing a copolymerized unit derived from a monomer that gives a crosslinking site. Examples of the monomer that gives a crosslinking site include iodine-containing monomers such as perfluoro(6,6-dihydro-6-iodo-3-oxa-1-hexene) and perfluoro(5-iodo-3-oxa-1-pentene) as disclosed in JP H05-63482 B and JP H07-316234 A, bromine-containing monomers as disclosed in JP H04-505341 T, cyano group-containing monomers as disclosed in JP H04-505345 T and JP H05-500070 T, carboxy group-containing monomers, and alkoxycarbonyl group-containing monomers.

The fluoroelastomer is also preferably a fluoroelastomer containing an iodine atom or a bromine atom at an end of the main chain. The fluoroelastomer containing an iodine atom or a bromine atom at an end of the main chain can be produced by emulsion polymerization of a monomer with addition of a radical initiator in the presence of a halogen compound in an aqueous medium and substantially in the absence of oxygen. Representative examples of the halogen compound to be used include compounds represented by the following formula:

wherein x and y are each an integer of 0 to 2, with $1 \leq x+y \leq 2$; $R^2$ is a C1-C16 saturated or unsaturated fluorohydrocarbon group, a C1-C16 saturated or unsaturated chlorofluorohydrocarbon group, a C1-C3 hydrocarbon group, or a C3-C10 cyclic hydrocarbon group optionally substituted with an iodine atom or a bromine atom, each optionally containing an oxygen atom.

Examples of the halogen compound include 1,3-diiodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1, 2-bromo-4-iodoperfluorobutene-1, monoiodo- and monobromo-substitution products of benzene, diiodo- and monobromo-substitution products of benzene, and (2-iodoethyl)- and (2-bromoethyl)-substitution products of benzene. These compounds may be used alone or in combination thereof.

In order to achieve good polymerization reactivity, crosslinking reactivity, and easy availability, preferred among these is 1,4-diiodoperfluorobutane or diiodomethane.

In order to achieve good processability in production of the fluoroelastomer composition, the fluoroelastomer preferably has a Mooney viscosity ($ML_{1+10}(100°$ C.$)$) of 5 to 200, more preferably 10 to 150, still more preferably 20 to 100.

The Mooney viscosity can be determined in conformity with ASTM-D1646.

Measurement device: MV2000E model available from Alpha Technologies Inc.

Rotational speed of rotor: 2 rpm
Measurement temperature: 100° C.

The fluoroelastomer composition preferably satisfies that the rubber component consists only of the fluoroelastomer.
(Compound (a))

The fluoroelastomer composition contains at least one compound (a) selected from the group consisting of a fluororesin (a1) and a phosphorus compound (a2).

The compound (a) is present in an amount of 0.01 to 120 parts by mass relative to 100 parts by mass of the fluoroelastomer. This enables firm bonding of the fluoroelastomer layer (A) and the fluororesin layer (B). The amount of the compound (a) is preferably 0.05 parts by mass or more, more preferably 0.1 parts by mass or more, still more preferably 0.3 parts by mass or more, particularly preferably 0.5 parts by mass or more, while preferably 90 parts by mass or less, more preferably 65 parts by mass or less, still more preferably 48 parts by mass or less, particularly preferably 47 parts by mass or less.

The fluoroelastomer composition also preferably contains a fluororesin (a1) as the compound (a). In order to achieve firmer bonding of the fluoroelastomer layer (A) and the fluororesin layer (B), the amount of the fluororesin (a1) in this case is preferably 0.5 to 100 parts by mass relative to 100 parts by mass of the fluoroelastomer, more preferably 10 parts by mass or more, still more preferably 20 parts by mass or more, particularly preferably 30 parts by mass or more, while more preferably 80 parts by mass or less, still more preferably 60 parts by mass or less, particularly preferably 45 parts by mass or less.

The fluoroelastomer composition also preferably contains a phosphorus compound (a2) as the compound (a). In order to achieve firmer bonding of the fluoroelastomer layer (A) and the fluororesin layer (B), the amount of the phosphorus compound (a2) in this case is preferably 0.01 to 20 parts by mass, more preferably 0.05 to 10 parts by mass, still more preferably 0.1 to 5 parts by mass, particularly preferably 0.3 to 3 parts by mass, most preferably 0.5 to 2 parts by mass, relative to 100 parts by mass of the fluoroelastomer.

In order to achieve firmer bonding of the fluoroelastomer layer (A) and the fluororesin layer (B), the fluoroelastomer composition also preferably contains both the fluororesin (a1) and the phosphorus compound (a2) as the compounds (a). In order to achieve firmer bonding of the fluoroelastomer layer (A) and the fluororesin layer (B), the amount of the fluororesin (a1) in this case is preferably 0.5 to 100 parts by mass relative to 100 parts by mass of the fluoroelastomer, more preferably 10 parts by mass or more, still more preferably 20 parts by mass or more, particularly preferably 30 parts by mass or more, while more preferably 80 parts by mass or less, still more preferably 60 parts by mass or less, particularly preferably 45 parts by mass or less. In order to achieve firmer bonding of the fluoroelastomer layer (A) and the fluororesin layer (B), the amount of the phosphorus compound (a2) in this case is preferably 0.01 to 20 parts by mass, more preferably 0.05 to 10 parts by mass, still more preferably 0.1 to 5 parts by mass, particularly preferably 0.3 to 3 parts by mass, most preferably 0.5 to 2 parts by mass, relative to 100 parts by mass of the fluoroelastomer.
(Fluororesin (a1))

The presence of the fluororesin (a1) in the fluoroelastomer composition allows firm bonding of the fluoroelastomer layer (A) and the fluororesin layer (B). The fluororesin usually has a melting point and thermoplasticity.

The fluororesin (a1) may be either a melt-fabricable fluororesin or a non melt-processible fluororesin, and is preferably a melt-fabricable fluororesin. The term "melt-fabricable" as used herein means that a polymer can be processed in a molten state using a conventional processing device such as an extruder or an injection molding machine. Thus, a melt-fabricable fluororesin usually has a melt flow rate of 0.01 to 100 g/10 min as determined by the measurement method to be described later.

Examples of the fluororesin (a1) include non melt-processible polytetrafluoroethylene (PTFE), low molecular weight polytetrafluoroethylene, TFE/PAVE copolymers (PFA), TFE/HFP copolymers (FEP), ethylene (Et)/TFE copolymers (ETFE), Et/TFE/HFP copolymers, polychlorotrifluoroethylene (PCTFE), CTFE/TFE copolymers, Et/CTFE copolymers, polyvinyl fluoride (PVF), and fluoromonomer/vinyl ester copolymers. Preferred among these is low molecular weight polytetrafluoroethylene.

The low molecular weight polytetrafluoroethylene preferably has melt-fabricability and non-fibrillatability.

The low molecular weight PTFE is a TFE polymer having a number average molecular weight of 600000 or lower. The "high molecular weight PTFE" having a number average molecular weight of greater than 600000 exhibits fibrillatability unique to PTFE (e.g., see JP H10-147617 A). The high molecular weight PTFE has a high melt viscosity and non melt-processibility. The high molecular weight PTFE exhibits fibrillatability when used as an additive, and thus PTFE particles are likely to aggregate and have poor dispersibility in a matrix material.

The low molecular weight PTFE is a TFE polymer having a melt viscosity of $1 \times 10^2$ to $7 \times 10^5$ (Pa·s) at 380° C. PTFE having a melt viscosity within the above range has a number average molecular weight within the above range.

The melt viscosity is a value determined by applying a load of 0.7 MPa to 2 g of a sample heated in advance at 380° C. for 5 minutes with the temperature being maintained at the aforementioned temperature using a flowtester (available from Shimadzu Corp.) and 2φ-8 L die in conformity with ASTM D1238. The number average molecular weights are values each calculated from the melt viscosity measured as described above.

The low molecular weight PTFE is preferably a TFE polymer having a melting point of 324° C. to 333° C.

The low molecular weight PTFE preferably has an average particle size of 0.01 to 1000 μm, more preferably 0.1 to 100 μm, still more preferably 0.3 to 50 μm, most preferably 0.5 to 20 μm.

The average particle size is determined as follows. That is, the particle size distribution is determined using a laser diffraction particle size distribution analyzer (e.g., available from Japan Laser Corp.) at a pressure of 0.1 MPa and a measurement time of 3 seconds without cascade impaction. The value corresponding to 50% of the cumulative volume in the resulting particle size distribution is taken as the average particle size.

The low molecular weight PTFE preferably has a melt flow rate (MFR) of 0.01 to 10 g/10 min at 372° C. (load: 1.2 kg).

The MFR can be specified by determining the weight (g) of the polymer that flows out of a nozzle having a diameter of 2 mm and a length of 8 mm per unit time (10 minutes) at 372° C. under a load of 1.2 kg using a melt indexer (e.g., available from Toyo Seiki Seisaku-sho, Ltd.).

The low molecular weight PTFE may be a TFE homopolymer, or may be a modified PTFE containing a TFE unit and a modifying monomer unit copolymerizable with TFE.

In the modified PTFE, the modifying monomer unit copolymerizable with TFE is preferably present in an amount of 0.01 to 1% by mass, still more preferably 0.01 to 0.5% by mass, most preferably 0.03 to 0.3% by mass, of all monomer units.

The "modifying monomer unit" as used herein means a moiety that is part of the molecular structure of modified PTFE and is derived from a modifying monomer. The term "all monomer units" as used herein means all moieties derived from a monomer in the molecular structure of modified PTFE. The amount of the modifying monomer unit is a value determined by infrared spectroscopy or nuclear magnetic resonance (NMR).

The modifying monomer in the modified PTFE may be any monomer copolymerizable with TFE. Examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ether; perfluoroalkyl ethylene; and ethylene. One modifying monomer may be used, or multiple modifying monomers may be used.

The perfluorovinyl ether may be any one, such as an unsaturated perfluoro compound represented by the following formula (I):

$$CF_2=CF-ORf \quad (I)$$

wherein Rf is a perfluoroorganic group. The term "perfluoroorganic group" as used herein means an organic group in which all hydrogen atoms binding to any of carbon atoms are replaced by fluorine atoms. The perfluoroorganic group may contain ether oxygen.

The perfluorovinyl ether may be perfluoro(alkyl vinyl ether) (PAVE) represented by the formula (I) wherein Rf is a C1-C10 perfluoroalkyl group. The perfluoroalkyl group preferably contains 1 to 5 carbon atoms.

Examples of the perfluoroalkyl group in the PAVE include a perfluoromethyl group, a perfluoroethyl group, a perfluoropropyl group, a perfluorobutyl group, a perfluoropentyl group, and a perfluorohexyl group. Preferred is perfluoropropyl vinyl ether (PPVE) in which the perfluoroalkyl group is a perfluoropropyl group.

Examples of the perfluorovinyl ether also include those represented by the formula (I) wherein Rf is a C4-C9 perfluoro(alkoxyalkyl) group, those in which Rf is a group represented by the following formula:

[Chem. 1]

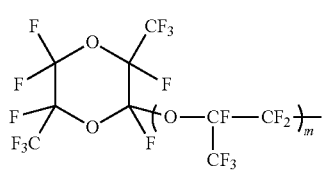

(wherein m is an integer of 0 or 1 to 4), and those in which Rf is a group represented by the following formula:

[Chem. 2]

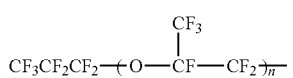

(wherein n is an integer of 1 to 4).

Examples of the perfluoroalkyl ethylene include, but are not limited to, perfluorobutyl ethylene (PFBE) and perfluorohexyl ethylene.

The modifying monomer in the modified PTFE is preferably at least one monomer selected from the group consisting of HFP, CTFE, VDF, PPVE, PFBE, and ethylene, more preferably HFP.

The low molecular weight PTFE is preferably a modified PTFE, more preferably a modified PTFE containing a TFE unit and a polymerized unit (HFP unit) derived from HFP.

The fluororesin (a1) preferably has an average particle size of 0.01 to 1000 μm, more preferably 0.1 to 100 μm, still more preferably 0.3 to 50 μm, most preferably 0.5 to 20 μm.

The average particle size is determined as follows. That is, the particle size distribution is determined using a laser diffraction particle size distribution analyzer (available from Japan Laser Corp.) at a pressure of 0.1 MPa and a measurement time of 3 seconds without cascade impaction. The value corresponding to 50% of the cumulative volume in the resulting particle size distribution is taken as the average particle size.

(Phosphorus Compound (a2))

The presence of the phosphorus compound (a2) in the fluoroelastomer composition allows firm bonding of the fluoroelastomer layer (A) and the fluororesin layer (B). The phosphorus compound (a2) is a compound containing at least one phosphorus atom in one molecule, and examples thereof include phosphines, esters of phosphoric acid, phosphazenes, phosphine oxides, esters of phosphonic acid, and esters of phosphinic acid.

In order to achieve firmer bonding of the fluoroelastomer layer (A) and the fluororesin layer (B), the phosphorus compound (a2) is preferably at least one selected from the group consisting of a phosphine compound represented by $PR_3$ (wherein the three Rs are the same as or different from each other, and are each a halogen atom or an organic group), a phosphonium salt, and a phosphine oxide. More preferred is a phosphine compound.

The phosphine compound is represented by $PR_3$, wherein the three Rs are the same as or different from each other, and are each a halogen atom or an organic group. The phosphine compound encompasses compounds having a structure represented by $PR_3$, such as triphenylphosphine hydrochloride, triphenylphosphine borane, and triphenylphosphine-triphenylborane complexes.

The organic group may be a C1-C30 hydrocarbon group optionally containing a substituent. The hydrocarbon group may be linear, branched, monocyclic, or polycyclic, may contain an unsaturated bond, may have aromaticity, and may contain a hetero atom. Examples of the substituent include an alkoxy group, an amino group, a cyano group, an aldehyde group, a carboxylic acid group, a halogen atom, a phosphino group, a phosphono group, and a diphenylphosphino group.

Examples of the phosphine compound include the following compounds.

[Chem. 3]

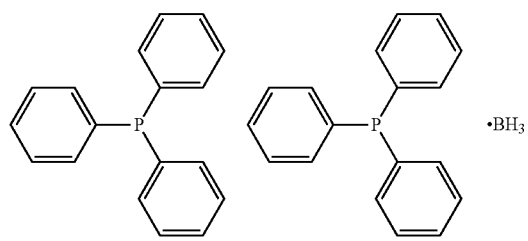

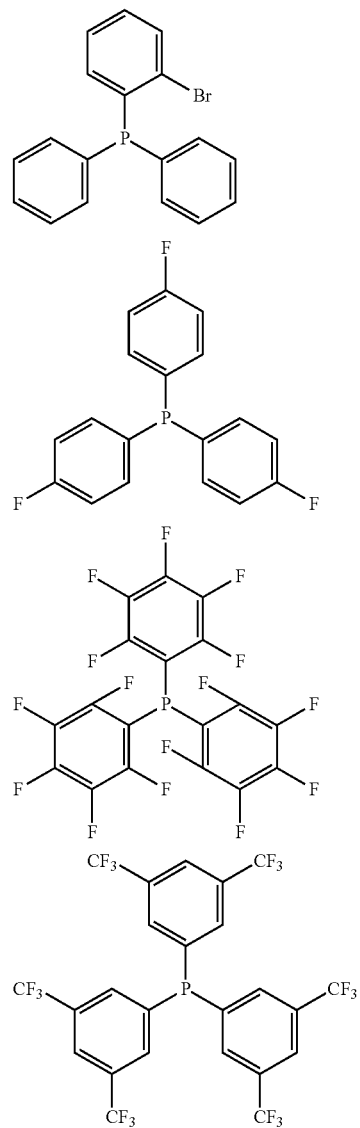

-continued

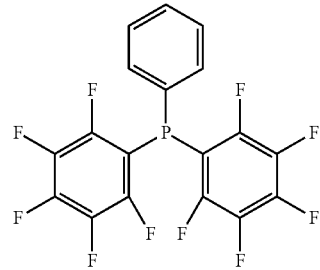

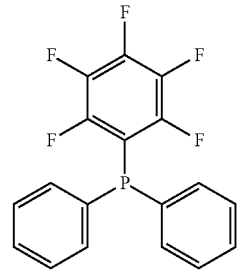

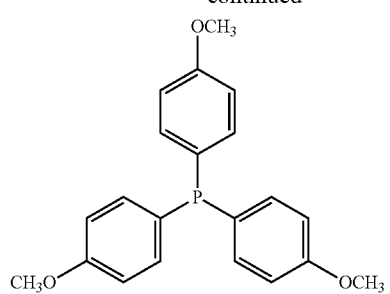
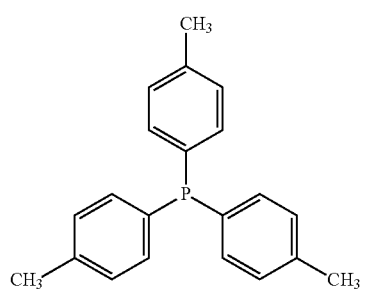
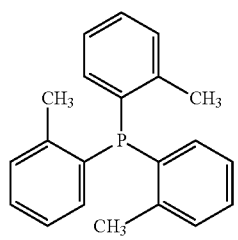
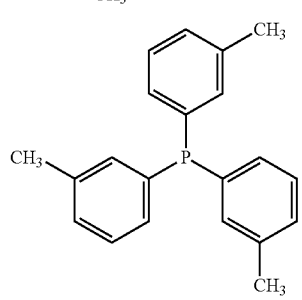
[Chem. 4]
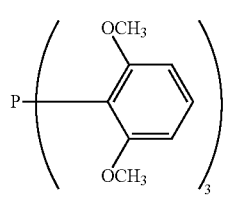
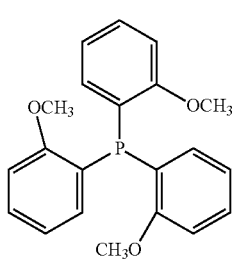
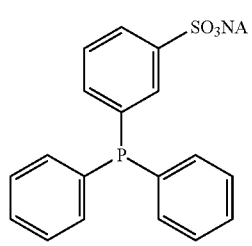
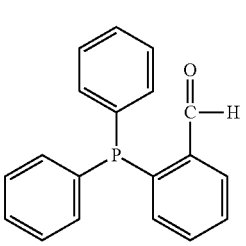
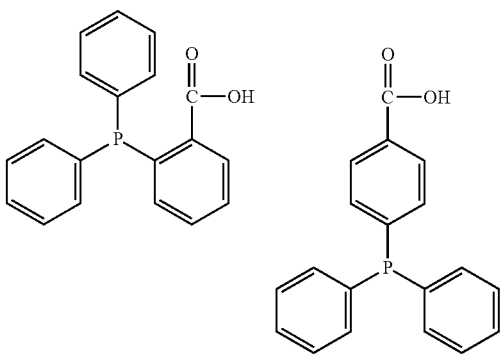
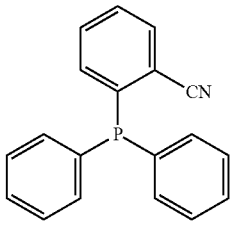
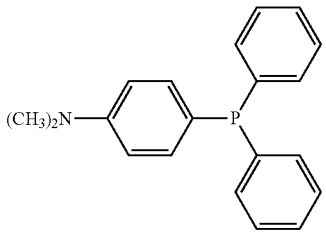
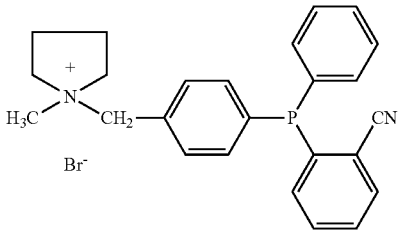
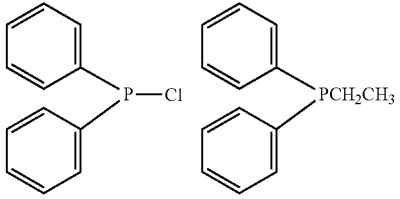
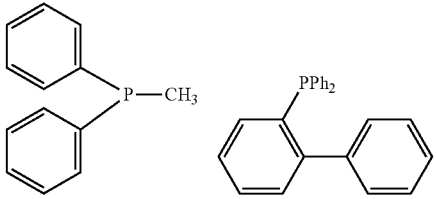
[Chem. 5]
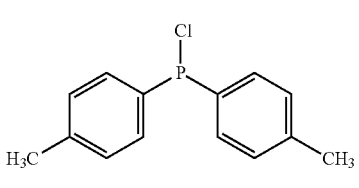

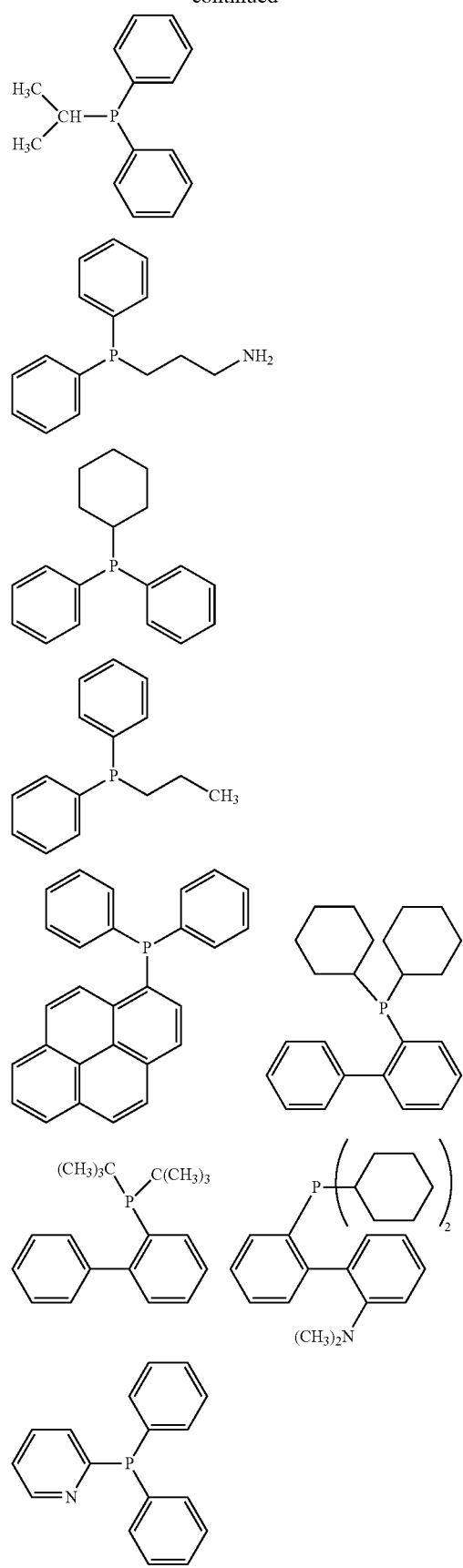
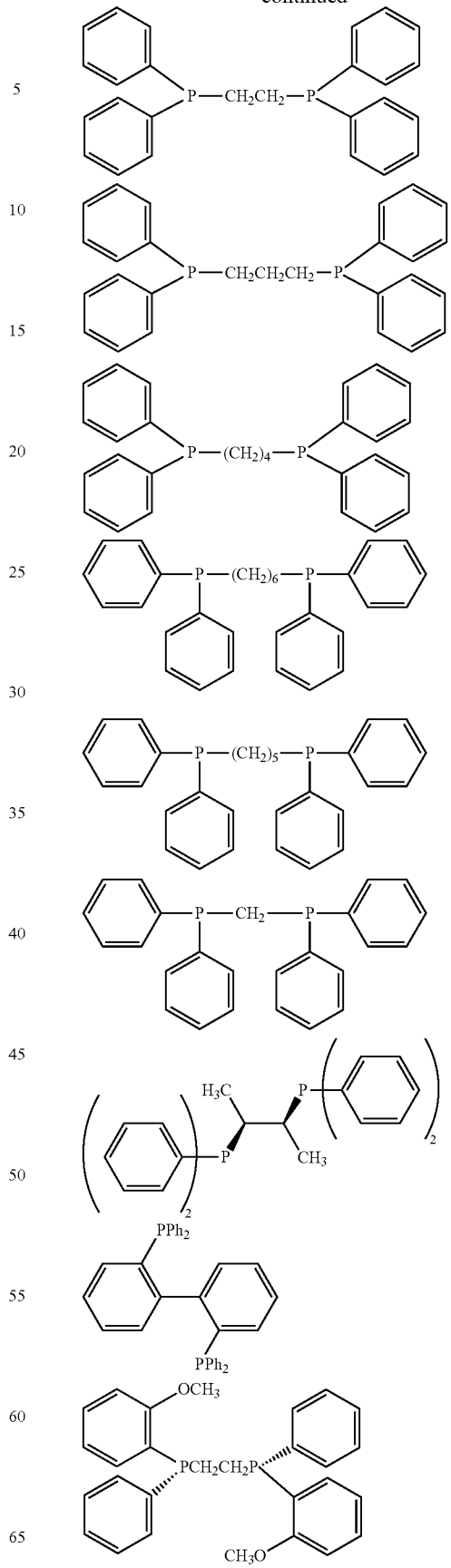
[Chem. 6]

-continued
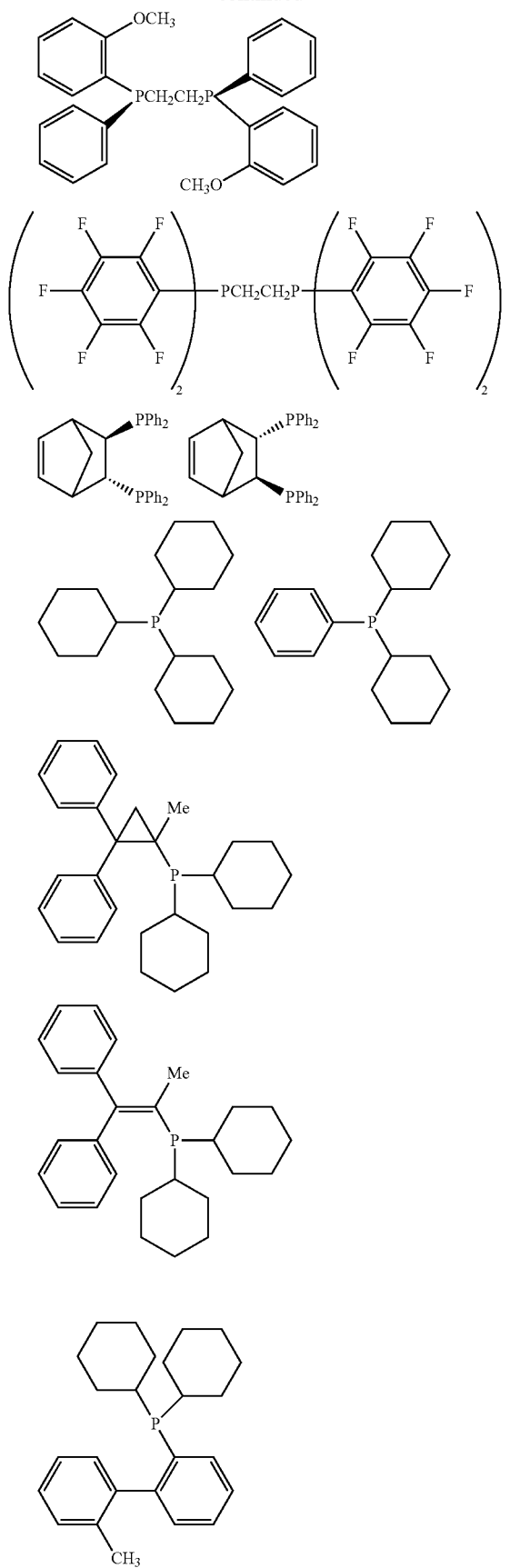
-continued
[Chem. 7]
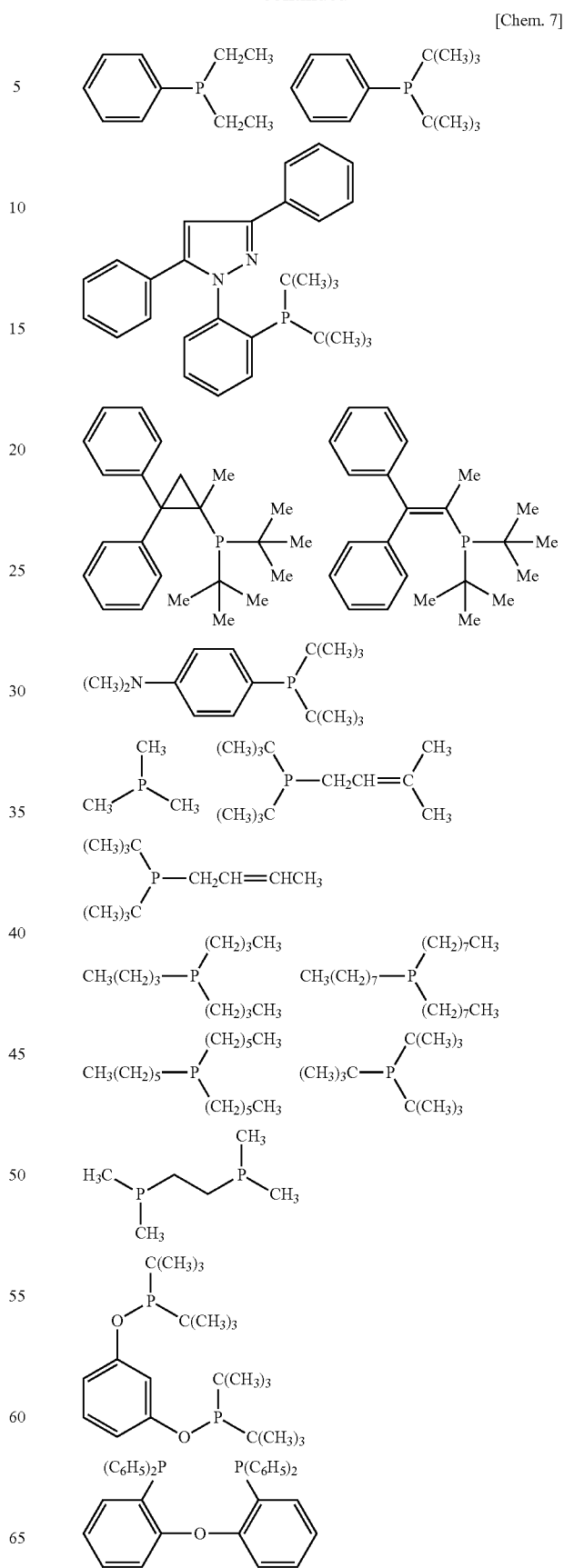

-continued
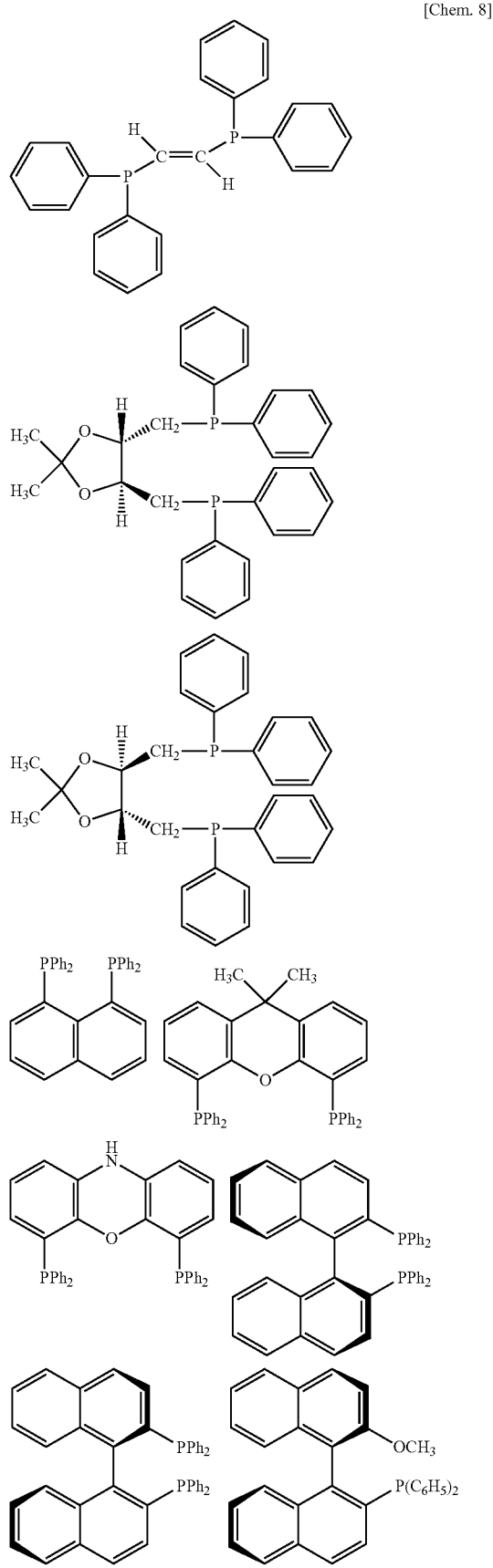
-continued
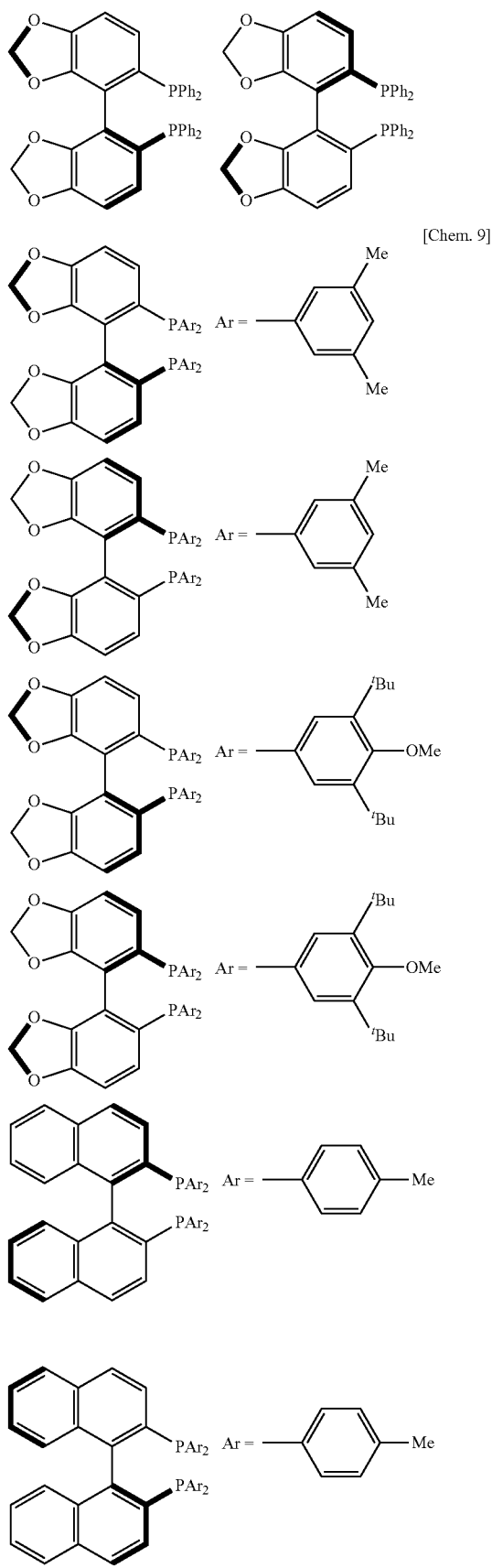

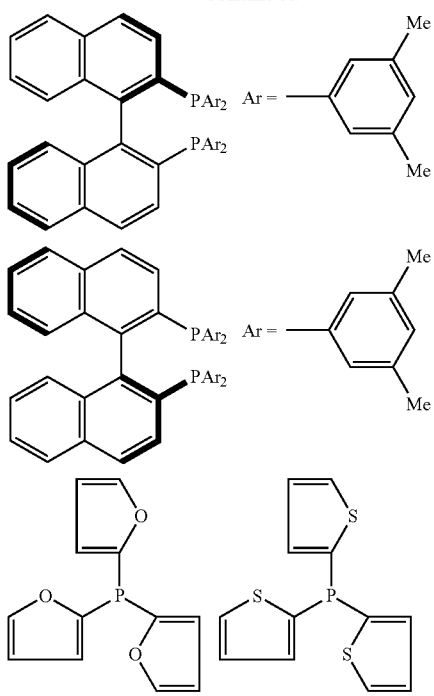
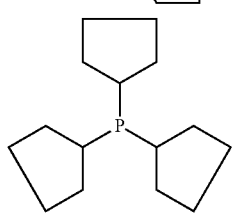
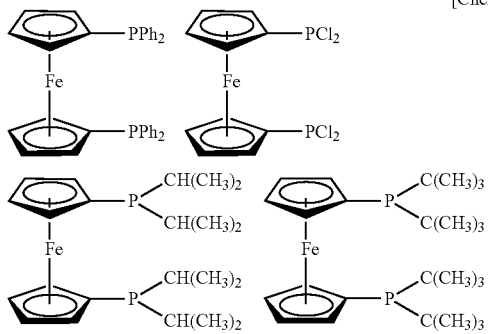

[Chem. 10]

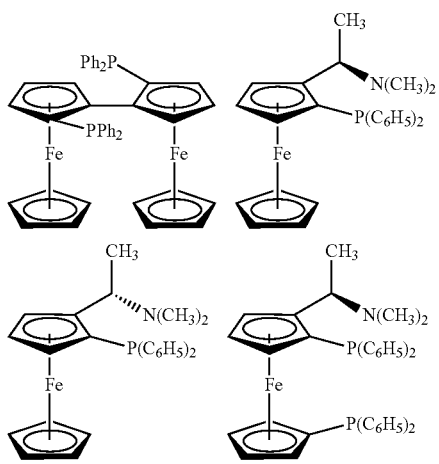

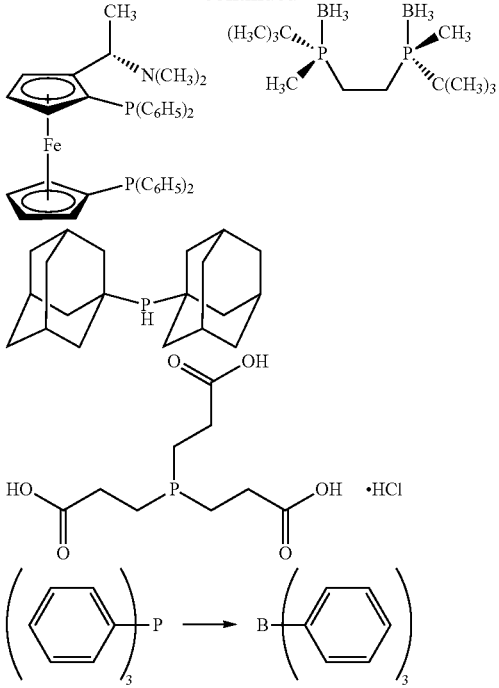

The phosphine compound is preferably any of the following compounds. One or two or more of the phosphine compounds may be used.

[Chem. 11]

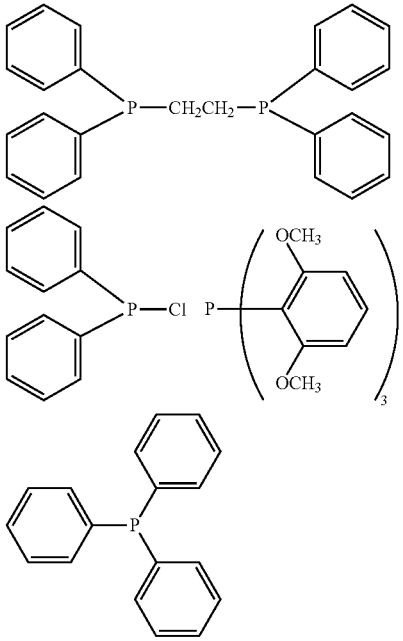

The phosphonium salt is preferably a quaternary phosphonium salt. Examples thereof include tetrabutylphosphonium chloride, benzyltriphenylphosphonium chloride, benzyltrimethylphosphonium chloride, benzyltributylphosphonium chloride, tributylallylphosphonium chloride, tributyl-2-methoxypropylphosphonium chloride, benzylphenyl(dimethylamino)phosphonium chloride, and tributyl(cyanomethyl)phosphonium chloride. The phosphonium salt can lead to high bond strength when used with the fluororesin (a1), especially low molecular weight PTFE.

The phosphine oxide is preferably a compound represented by the formula: $R_3P(=O)$, wherein the three Rs are the same as or different from each other, and are each a halogen atom or an organic group.

The organic group may be a C1-C30 hydrocarbon group optionally containing a substituent. The hydrocarbon group may be linear, branched, monocyclic, or polycyclic, may contain an unsaturated bond, may have aromaticity, and may contain a hetero atom. Examples of the substituent include an alkoxy group, an amino group, a cyano group, an aldehyde group, a carboxylic acid group, a halogen atom, a phosphino group, a phosphono group, and a diphenylphosphino group.

The phosphine oxide is preferably the following compound.

[Chem. 12]

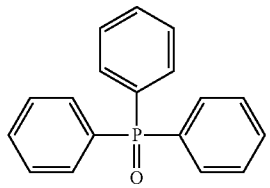

(Basic Multifunctional Compound)

The fluoroelastomer composition contains a basic multifunctional compound. This allows firmer bonding of the fluoroelastomer layer (A) and the fluororesin layer (B). The basic multifunctional compound is a compound that contains two or more functional groups having the same structure or having different structures in one molecule and that exhibits basicity.

The functional groups in the basic multifunctional compound are preferably those exhibiting basicity, and are each preferably at least one selected from the group consisting of —$NH_2$, —$NH_3^+$, —NHCOOH, —$NHCOO^-$, —N=$CR^1R^2$ (wherein $R^1$ and $R^2$ are each individually a C0-C12 organic group), —$NR^3R^4$ (wherein $R^3$ and $R^4$ are each individually a C0-C12 organic group), —$NR^3R^4R^5$ (wherein $R^3$, $R^4$, and $R^5$ are each individually a C0-C12 organic group), and functional groups to be converted into the above functional groups by heat; more preferably at least one selected from the group consisting of —$NH_2$, —$NH_3^+$, —N=$CR^1R^2$ (wherein $R^1$ and $R^2$ are defined as described above), and $NR^3R^4R^5$ (wherein $R^3$, $R^4$, and $R^5$ are defined as described above); still more preferably at least one selected from the group consisting of —$NH_2$, —$NH_3^+$, and —N=$CR^1R^2$ (wherein $R^1$ and $R^2$ are defined as described above).

$R^1$, $R^2$, $R^3$, $R^4$, and $R^5$ are each individually preferably —H or a C1-C12 organic group, preferably —H or a C1-C12 hydrocarbon group. The hydrocarbon group may contain one or two or more carbon-carbon double bonds. The hydrocarbon group preferably contains 1 to 8 carbon atoms.

Preferably, $R^1$ is —H or —$CH_3$ and $R^2$ is —CH=$CHR^6$ (wherein $R^6$ is a phenyl group (—$C_6H_5$), a benzyl group (—$CH_2$—$C_6H_5$), or —H). More preferably, $R^1$ is —H and $R^2$ is —CH=CH—$C_6H_5$.

Examples of the basic multifunctional compound include ethylenediamine, propanediamine, putrescine, cadaverine, hexamethylenediamine, heptanediamine, octanediamine, nonanediamine, decanediamine, undecanediamine, dodecanediamine, phenylenediamine, N,N'-dicinnamylidene-1,6-hexamethylenediamine, N,N,N',N'-tetramethyl-1,6-hexamethylenediamine, N,N'-dimethyl-1,6-hexamethylenediamine, and 6-aminohexylcarbamic acid.

The basic multifunctional compound contains at least two nitrogen atoms in the molecule and the nitrogen-nitrogen interatomic distance is 5.70 Å or greater. The nitrogen-nitrogen interatomic distance is more preferably 6.30 Å or greater, still more preferably 7.60 Å or greater, particularly preferably 8.60 Å or greater. A wide nitrogen-nitrogen interatomic distance can lead to better flexibility of the basic multifunctional compound, resulting in easy vulcanization.

The nitrogen-nitrogen interatomic distance is calculated in accordance with the following method. That is, the structural optimization of each base is calculated using the density functional theory (program: Gaussian03, density functional: B3LYP, basis function: 6-31G*).

In order to achieve good adhesion of the fluoroelastomer layer (A) and the fluororesin layer (B), the basic multifunctional compound is preferably at least one selected from the group consisting of N,N'-dicinnamylidene-1,6-hexamethylene diamine and $NH_2$—$(CH_2)_n$—$NH_2$ (wherein n is 5 to 12), more preferably at least one compound selected from the group consisting of hexamethylenediamine and N,N'-dicinnamylidene-1,6-hexamethylenediamine.

In order to achieve firmer bonding of the fluoroelastomer layer (A) and the fluororesin layer (B), the basic multifunctional compound in the fluoroelastomer composition is preferably present in an amount of 0.5 parts by mass or more, more preferably 0.6 parts by mass or more, still more preferably 0.8 parts by mass or more, particularly preferably 1.0 part by mass or more, most preferably 1.5 parts by mass or more, relative to 100 parts by mass of the fluoroelastomer.

In order to reduce vulcanization inhibition and the cost, the amount of the basic multifunctional compound is preferably 10 parts by mass or less, more preferably 6 parts by mass or less, still more preferably 5 parts by mass or less, most preferably 3 parts by mass or less.

(Other Components)

In order to achieve firmer bonding of the fluoroelastomer layer (A) and the fluororesin layer (B), the fluoroelastomer composition may preferably further contain a vulcanizing agent. The vulcanizing agent may be selected in accordance with the purpose thereof, and may be a peroxide-vulcanizing agent, for example. The fluoroelastomer composition preferably contains a peroxide-vulcanizing agent.

Examples of the peroxide vulcanizing agent include, but are not limited to, organic peroxides. The organic peroxides are preferably those which easily generate peroxy radicals in the presence of heat or a redox system. Examples thereof include 1,1-bis(t-butylperoxy)-3,5,5-trimethylcyclohexane, 2,5-dimethylhexane-2,5-dihydroxyperoxide, di-t-butyl peroxide, t-butyl cumyl peroxide, dicumyl peroxide, α,α'-bis(t-butylperoxy)-p-diisopropylbenzene, 2,5-dimethyl-2,5-di(t-butylperoxy)hexane, 2,5-dimethyl-2,5-di(t-butylperoxy)hexyne-3, benzoyl peroxide, t-butylperoxybenzene, 2,5-dimethyl-2,5-di(benzoylperoxy)hexane, t-butylperoxymaleic acid, and t-butylperoxy isopropyl carbonate. More preferred are dialkyl compounds.

The amount thereof is usually selected as appropriate in accordance with factors such as the amount of active —O—O— and the decomposition temperature. The amount thereof is usually 0.1 to 15 parts by mass, preferably 0.3 to 5 parts by mass, more preferably 1 to 2 parts by mass, relative to 100 parts by mass of the fluoroelastomer.

The organic peroxide used as a vulcanizing agent may be used in combination with a vulcanization aid or a co-vulcanizing agent. Examples of the vulcanization aid or co-vulcanizing agent include, but are not limited to, the aforementioned vulcanization aids and co-vulcanizing agents. In order to achieve good vulcanizability and physical properties of a vulcanizate, triallyl isocyanurate (TAIL) is preferred.

The amount of the vulcanization aid or co-vulcanizing agent is preferably 0.2 to 10 parts by mass, more preferably 0.5 to 9 parts by mass, still more preferably 2 to 8 parts by mass, most preferably 3 to 7 parts by mass, relative to 100 parts by mass of the fluoroelastomer. Less than 0.2 parts by mass of the vulcanizing agent or co-vulcanizing agent tends to cause a low vulcanization density and a high compression set. More than 10 parts by mass thereof tends to cause too high a vulcanization density, causing easy cracking in compression.

The fluoroelastomer composition may further contain, as an acid acceptor or a compounding agent for improving the adhesion between the fluoroelastomer layer (A) and the fluororesin layer (B), at least one compound selected from the group consisting of a metal oxide, a metal hydroxide, a weak acid salt of alkali metal, and a weak acid salt of alkaline earth metal.

Examples of the metal oxide, metal hydroxide, weak acid salt of alkali metal, and weak acid salt of alkaline earth metal include: oxides, hydroxides, carbonates, carboxylates, silicates, borates, and phosphites of metals in the group (II) of the periodic table; and oxides, basic carbonates, basic carboxylates, basic phosphites, and basic sulfites of metals in the group (IV) of the periodic table.

Specific examples of the metal oxide, metal hydroxide, weak acid salt of alkali metal, and weak acid salt of alkaline earth metal include magnesium oxide, zinc oxide, magnesium hydroxide, barium hydroxide, magnesium carbonate, barium carbonate, calcium oxide (quicklime), calcium hydroxide (slaked lime), calcium carbonate, calcium silicate, calcium stearate, zinc stearate, calcium phthalate, calcium phosphite, tin oxide, and basic tin phosphite.

In the case of using the organic peroxide as the vulcanizing agent, the amount of the metal oxide, metal hydroxide, weak acid salt of alkali metal, and weak acid salt of alkaline earth metal is preferably 5 parts by mass or less, more preferably 3 parts by mass or less. In order to achieve good acid resistance, the absence thereof is still more preferred.

The fluoroelastomer composition may contain common additives to be blended into fluoroelastomer compositions as appropriate, and examples thereof include various additives such as a filler, processing aid, plasticizer, colorant, stabilizer, adhesive aid, acid acceptor, release agent, conductivity-imparting agent, thermal-conductivity-imparting agent, surface non-adhesive agent, flexibility-imparting agent, heat resistance improver, and flame retarder. One or more of common vulcanizing agents and vulcanization accelerators other than those mentioned above may also be contained.

The filler may be carbon black. The carbon black is preferably used in an amount of 0 to 100 parts by mass, more preferably 2 to 60 parts by mass, still more preferably 5 to 40 parts by mass, particularly preferably 10 to 30 parts by mass, relative to 100 parts by mass of the fluoroelastomer. The presence of carbon black can advantageously improve the properties such as mechanical properties and heat resistance.

The fluoroelastomer composition can be produced by kneading the components using a rubber kneader usually used. Examples of the rubber kneader include a roll, a kneader, a Banbury mixer, an internal mixer, and a twin-screw extruder.

(B) Fluororesin Layer

The fluororesin layer (B) is formed from a fluororesin (b1), and the fluororesin (b1) has a fuel permeability coefficient of 2.0 g·mm/m$^2$/day or lower.

The fluororesin (b1) having a fuel permeability coefficient of 2.0 g·mm/m$^2$/day or less can lead to excellently low fuel permeability. Thus, the laminate of the invention can suitably be used as a fuel hose, for example.

The fuel permeability coefficient is preferably 1.5 g·mm/m$^2$/day or lower, more preferably 0.8 g·mm/m$^2$/day or lower, still more preferably 0.55 g·mm/m$^2$/day or lower, particularly preferably 0.5 g·mm/m$^2$/day or lower.

The fuel permeability coefficient is a value calculated from the mass change determined as follows. Specifically, a SUS316 fuel permeability coefficient measurement cup having an inner diameter of 40 mmø and a height of 20 mm is charged with 18 mL of an isooctane-toluene-ethanol solvent mixture in which isooctane, toluene, and ethanol are mixed at a ratio by volume of 45:45:10; a fluororesin sheet (diameter: 45 mm, thickness: 120 µm) is prepared from the measurement target resin by the following method and is put into the measurement cup; and then the mass change is determined at 60° C.

(Method for Producing Fluororesin Sheet)

Resin pellets are put into a mold having a diameter of 120 mm. The workpiece is mounted on a press heated up to 300° C. and the pellets are melt-pressed at a pressure of about 2.9 MPa, whereby a fluororesin sheet having a thickness of 0.12 mm is obtained. This sheet is then processed to have a diameter of 45 mm and a thickness of 120 µm.

In order to provide a laminate having excellently low fuel permeability, the fluororesin (b1) is preferably at least one selected from the group consisting of polychlorotrifluoroethylene (PCTFE), a CTFE copolymer, and a TFE/HFP/VdF copolymer, more preferably at least one selected from the group consisting of polychlorotrifluoroethylene (PCTFE) and a CTFE copolymer. In order to achieve low fuel permeability and good flexibility, a CTFE copolymer is still more preferred.

A lower VdF content leads to lower fuel permeability. Thus, the TFE/HFP/VdF copolymer preferably satisfies a TFE/HFP/VdF copolymerization ratio (ratio by mol %) of (75 to 95)/(0.1 to 10)/(0.1 to 19), more preferably (77 to 95)/(1 to 8)/(1 to 17) (ratio by mole), still more preferably (77 to 95)/(2 to 8)/(2 to 15.5) (ratio by mole), most preferably (79 to 90)/(5 to 8)/(5 to 15) (ratio by mole). The TFE/HFP/VdF copolymer may contain 0 to 20 mol % of a different monomer. The different monomer may be at least one monomer selected from the group consisting of fluorine-containing monomers such as perfluoro(methyl vinyl ether), perfluoro(ethyl vinyl ether), perfluoro(propyl vinyl ether), chlorotrifluoroethylene, 2-chloropentafluoropropene, perfluorinated vinyl ether (e.g., perfluoroalkoxy vinyl ethers such as $CF_3OCF_2CF_2CF_2OCF=CF_2$) perfluoroalkyl vinyl ether, perfluoro-1,3-butadiene, trifluoroethylene, hexafluoroisobutene, vinyl fluoride, ethylene, propylene, and alkyl vinyl ether. Preferred are perfluoro(methyl vinyl ether), perfluoro(ethyl vinyl ether), and perfluoro(propyl vinyl ether).

The PCTFE is a homopolymer of chlorotrifluoroethylene.

The CTFE copolymer preferably contains a copolymerized unit (CTFE unit) derived from CTFE and a copolymerized unit derived from at least one monomer selected from the group consisting of TFE, HFP, PAVE, VdF, vinyl fluoride, hexafluoroisobutene, monomers represented by the following formula:

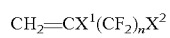

(wherein $X^1$ is H or F; $X^2$ is H, F, or Cl; and n is an integer of 1 to 10), ethylene, propylene, 1-butene, 2-butene, vinyl chloride, and vinylidene chloride.

The CTFE copolymer is more preferably a perhalopolymer.

The CTFE copolymer more preferably contains a CTFE unit and a copolymerized unit derived from at least one monomer selected from the group consisting of TFE, HFP, and PAVE, still more preferably consists essentially of these copolymerized units. In order to achieve low fuel permeability, the CTFE copolymer is preferably free from a monomer containing a CH bond, such as ethylene, vinylidene fluoride, and vinyl fluoride.

A perhalopolymer that contains no monomer containing a CH bond usually has difficulty in bonding to a fluoroelastomer. Still, the structure of the invention can provide firm interlayer bonding of the fluororesin layer (B) and the fluoroelastomer layer (A) even when the fluororesin layer (B) is a layer formed from a perhalopolymer.

The CTFE copolymer preferably contains a CTFE unit in an amount of 10 to 90 mol % of all monomer units.

The CTFE copolymer particularly preferably contains a CTFE unit, a TFE unit, and a monomer (a) unit derived from a monomer (a) copolymerizable therewith.

The "CTFE unit" and the "TFE unit" are respectively a moiety (—CFCl—CF$_2$—) derived from CTFE and a moiety (—CF$_2$—CF$_2$—) derived from TFE in the molecular structure of the CTFE copolymer. The "monomer (a) unit" is similarly a moiety formed by addition of a monomer (a) in the molecular structure of the CTFE copolymer.

The monomer (a) may be any monomer copolymerizable with CTFE and TFE. Examples thereof include ethylene (Et), vinylidene fluoride (VdF), PAVE represented by $CF_2$=CF—ORf$^1$ (wherein Rf$^1$ is a C1-C8 perfluoroalkyl group), vinyl monomers represented by $CX^3X^4$=$CX^5$ $(CF_2)_n$ $X^6$ (wherein $X^3$, $X^4$, and $X^5$ are the same as or different from each other, and are each a hydrogen atom or a fluorine atom; $X^6$ is a hydrogen atom, a fluorine atom, or a chlorine atom; and n is an integer of 1 to 10), and alkyl perfluorovinyl ether derivatives represented by $CF_2$=CF—O—Rf$^2$ (wherein Rf$^2$ is a C1-C5 perfluoroalkyl group).

Preferred among the alkyl perfluorovinyl ether derivatives are those in which Rf$^2$ is a C1-C3 perfluoroalkyl group, and more preferred is $CF_2$=CF—OCF$_2$—CF$_2$CF$_3$.

The monomer (α) is preferably at least one selected from the group consisting of PAVE, the vinyl monomers, and the alkyl perfluorovinyl ether derivatives, more preferably at least one selected from the group consisting of PAVE and HFP, particularly preferably PAVE.

For the ratio of the CTFE unit and the TFE unit in the CTFE copolymer, the CTFE unit represents 15 to 90 mol % and the TFE unit represents 85 to 10 mol %, more preferably the CTFE unit represents 20 to 90 mol % and the TFE unit represents 80 to 10 mol %. Also preferred is a structure in which the CTFE unit represents 15 to 25 mol % and the TFE unit represents 85 to 75 mol %.

The CTFE copolymer preferably satisfies that the CTFE unit and the TFE unit represent 90 to 99.9 mol % in total and the monomer (a) unit represents 0.1 to 10 mol %. Less than 0.1 mol % of the monomer (a) unit may cause poor moldability, environmental stress cracking resistance, and fuel crack resistance. More than 10 mol % thereof tends to cause insufficiently low fuel permeability, poor heat resistance, and poor mechanical properties.

In order to achieve low fuel permeability and good adhesion, the fluororesin (b1) is more preferably at least one selected from the group consisting of PCTFE, a CTFE/TFE/PAVE copolymer, and a TFE/HFP/VdF copolymer, still more preferably at least one selected from the group consisting of a CTFE/TFE/PAVE copolymer and a TFE/HFP/VdF copolymer, particularly preferably a CTFE/TFE/PAVE copolymer.

The CTFE/TFE/PAVE copolymer is a copolymer consisting essentially of CTFE, TFE, and PAVE.

Examples of the PAVE in the CTFE/TFE/PAVE copolymer include perfluoro(methyl vinyl ether) (PMVE), perfluoro(ethyl vinyl ether) (PEVE), perfluoro(propyl vinyl ether) (PPVE), and perfluoro(butyl vinyl ether). Preferred among these is at least one selected from the group consisting of PMVE, PEVE, and PPVE.

In the CTFE/TFE/PAVE copolymer, the PAVE unit preferably represents 0.5 mol % or more and 5 mol % or less of all monomer units.

The constituent units such as a CTFE unit are values obtainable by $^{19}$F-NMR analysis.

The fluororesin (b1) may contain at least one reactive functional group selected from the group consisting of a carbonyl group, a hydroxy group, a heterocyclic group, and an amino group introduced into a side chain and/or an end of the main chain of the polymer.

The term "carbonyl group" as used herein means a divalent carbon group containing a carbon-oxygen double bond, which is typified by —C(=O)—. Examples of a reactive functional group containing a carbonyl group include, but are not limited to, those containing a carbonyl group as a moiety of the chemical structure, such as a carbonate group, a carboxylic acid halide group (halogenoformyl group), a formyl group, a carboxy group, an ester bond (—C(=O)O—), an acid anhydride bond (—C(=O)O—C(=O)—), an isocyanate group, an amide group, an imide group (—C(=O)—NH—C(=O)—), a urethane bond (—NH—C(=O)O—), a carbamoyl group (NH$_2$—C(=O)—), a carbamoyloxy group (NH$_2$—C(=O)O—), a ureido group (NH$_2$—C(=O)—NH—), and an oxamoyl group (NH$_2$—C(=O)—C(=O)—).

In groups such as an amide group, an imide group, a urethane bond, a carbamoyl group, a carbamoyloxy group, a ureido group, and an oxamoyl group, a hydrogen atom binding to the nitrogen atom thereof may be replaced by a hydrocarbon group such as an alkyl group.

In order to achieve easy introduction and to allow the fluororesin (b1) to have moderate heat resistance and good adhesion at relatively low temperatures, the reactive functional group is preferably an amide group, a carbamoyl group, a hydroxy group, a carboxy group, a carbonate group, a carboxylic acid halide group, or an acid anhydride bond, more preferably an amide group, a carbamoyl group, a hydroxy group, a carbonate group, a carboxylic acid halide group, or an acid anhydride bond.

The fluororesin (b1) may be obtainable by any conventionally known polymerization method such as suspension polymerization, solution polymerization, emulsion polymerization, or bulk polymerization. In the polymerization, the conditions such as the temperature and the pressure, a polymerization initiator and other additives may appropriately be selected in accordance with the composition and amount of the fluororesin (b1).

The fluororesin (b1) preferably has a melting point of 160° C. to 270° C., although not limited thereto. The melting point of the fluororesin (b1) is defined as the temperature corresponding to the maximum value on a heat-of-fusion curve obtained by increasing the temperature at a rate of 10° C./rain using a DSC device (available from Seiko Instruments Inc.).

The fluororesin (b1) preferably has a molecular weight that allows the resulting laminate to exert characteristics such as good mechanical properties and low fuel permeability. For example, with the melt flow rate (MFR) taken as an indicator of the molecular weight, the MFR is preferably 0.5 to 100 g/10 min at any temperature within the range of about 230° C. to 350° C., which is a common molding temperature range for fluororesins. The MFR is more preferably 1 to 50 g/10 min, still more preferably 2 to 35 g/10 min. For example, for the fluororesin (b1) that is PCTFE, a CTFE copolymer, or a TFE/HFP/VdF copolymer, the MFR is measured at 297° C.

The MFR can be specified by determining the weight (g) of the polymer that flows out of a nozzle having a diameter of 2 mm and a length of 8 mm per unit time (10 minutes) at 297° C. under a load of 5 kg, for example, using a melt indexer (available from Toyo Seiki Seisaku-sho, Ltd.).

In the invention, the fluororesin layer (B) may contain one or two or more of the fluororesins (b1).

The fluororesin (b1) can lead to better chemical resistance and lower fuel permeability when it is a perhalo polymer. The perhalo polymer is a polymer in which every carbon atom constituting the main chain of the polymer is coupled with a halogen atom.

The fluororesin layer (B) may further contain any of various fillers such as inorganic powder, glass fiber, carbon powder, carbon fiber, and metal oxides in accordance with the purpose and application thereof to the extent that does not impair the performance thereof.

For example, in order to further reduce the fuel permeability, any of smectite-type lamellar viscous minerals such as montmorillonite, beidellite, saponite, nontronite, hectorite, sauconite, and stevensite and fine lamellar minerals having a high aspect ratio such as mica may be added.

In order to impart conductivity, a conductive filler may be added. Examples of the conductive filler include, but are not limited to, powder or fiber of conductive simple substance such as metal or carbon; powder of a conductive compound such as zinc oxide; and powder whose surface has undergone conductivity-imparting treatment. In the case of adding a conductive filler, the filler is preferably melt-kneaded into pellets in advance.

Examples of the powder or fiber of conductive simple substance include, but are not limited to, powder of metal such as copper or nickel; fiber of metal such as iron or stainless steel; and carbon black, carbon fiber, and carbon fibril disclosed in JP H03-174018 A.

The powder whose surface has undergone conductivity-imparting treatment is powder obtainable by subjecting the surface of non-conductive powder such as glass beads or titanium oxide to conductivity-imparting treatment.

Examples of the conductivity-imparting treatment on the surface include, but are not limited to, metal sputtering and electroless plating.

Carbon black is suitably used among the above conductive fillers because it is advantageous to economic efficiency and prevention of storage of static electricity.

The fluororesin composition containing a conductive filler preferably has a volume resistivity of $1 \times 10^0$ to $1 \times 10^9$ Ω·cm. The lower limit thereof is more preferably $1 \times 10^2$ Ω·cm, while the upper limit thereof is more preferably $1 \times 10^8$ Ω·cm.

In addition to the filler, any other appropriate additives such as a thermal stabilizer, a reinforcing agent, an ultraviolet absorber, and a pigment may be added.

(Laminate)

In the laminate of the invention, the fluoroelastomer layer (A) may preferably have a thickness of, but not limited to, 100 μm or greater. The upper limit of the thickness of the fluoroelastomer layer (A) may be 5000 μm, for example.

The fluororesin layer (B) may preferably have a thickness of, but not limited to, 10 μm or greater, for example. The upper limit of the thickness of the fluororesin layer (B) may be 1000 μm, for example.

The laminate of the invention preferably has a bond strength between the fluoroelastomer layer (A) and the fluororesin layer (B) of 7 N/cm or higher, more preferably 11 N/cm or higher. The layers satisfying a bond strength of 7 N/cm or higher are advantageously less likely to suffer slippage in vulcanization of a hose in a specific shape and are less likely to suffer peeling when an impact is applied thereto. The laminate of the invention having the above structure can achieve a bond strength within the above range. The bond strength is still more preferably 12 N/cm or higher, particularly preferably 15 N/cm or higher.

The bond strength is determined as follows. The laminate is cut into three strips having a width of 10 mm and a length of 40 mm, whereby test pieces are prepared. For each of these test pieces, in order to determine the bond strength of the bonded surface alone without the bond strength of the interface between the fluoroelastomer layer (A) and the fluororesin layer (B), the interface between the fluoroelastomer layer (A) and the fluororesin layer (B) is slowly stretched by hand once to increase the grip section by 2 to 3 mm. Then, the test piece is subjected to a peeling test at 25° C. and a tensile rate of 50 mm/min using an autograph (AGS-J 5 kN, available from Shimadzu Corp.) in conformity with JIS K 6256 (Determination of adhesion strength for vulcanized rubber). The mode of peeling is then observed. The value thereby obtained is defined as the bond strength.

In the laminate of the invention, the fluoroelastomer layer (A) and the fluororesin layer (B) are preferably vulcanization bonded to each other. Such a laminate is obtainable by stacking the fluoroelastomer layer (A) in an unvulcanized form and the fluororesin layer (B) and then vulcanizing the workpiece.

The vulcanization can be performed by a conventionally known vulcanization method under conventionally known vulcanization conditions for fluoroelastomer compositions. Examples thereof include a method of vulcanizing an unvulcanized laminate for a long time, and a method of heating an unvulcanized laminate for a relatively short time as a pretreatment (vulcanization also occurs), and then vulcanizing the workpiece for a long time. Preferred between them is a method of heating an unvulcanized laminate for a relatively short time as a pretreatment (vulcanization also occurs), and then vulcanizing the workpiece for a long time. This is because the pretreatment can easily lead to adhesion between the fluoroelastomer layer (A) and the fluororesin layer (B) and the pretreatment allows the fluoroelastomer layer (A) to be vulcanized already and to have a stable shape, which can provide various choices of a method of holding the laminate during the following vulcanization.

The vulcanization may be performed under any usual conditions. Preferably, the vulcanization is performed at 140° C. to 180° C. for 2 to 80 minutes using steam, press, oven, air bath, infrared radiation, microwaves, lead-covered vulcanization, or the like. The vulcanization is more preferably performed at 150° C. to 170° C. for 5 to 60 minutes. The vulcanization may be divided into a first vulcanization and a second vulcanization.

A preferred method of producing a laminate including a fluoroelastomer layer and a fluororesin layer firmly bonded to each other is a method of producing a laminate, including: mixing the fluoroelastomer, the basic multifunctional compound, and the compound (a) to provide a fluoroelastomer composition; stacking an unvulcanized fluoroelastomer layer obtainable by molding the fluoroelastomer composition and a fluororesin layer; and vulcanizing the stacked unvulcanized fluoroelastomer and fluororesin layers, wherein the fluororesin layer is formed from a fluororesin (b1) having a fuel permeability coefficient of 2.0 g·mm/m$^2$/day or lower.

This production method can provide the aforementioned laminate of the invention.

In the production method of the invention, the vulcanization conditions are the same as those described above.

Mixing the fluoroelastomer, the basic multifunctional compound, and the compound (a) to form the fluoroelastomer composition may be kneading of the fluoroelastomer, the basic multifunctional compound, and the compound (a) using a rubber kneader usually used.

Examples of the rubber kneader to be used include a roll, a kneader, a Banbury mixer, an internal mixer, and a twin-screw extruder.

In the mixing, the fluoroelastomer, the basic multifunctional compound, and the compound (a), and optionally any other additives such as a vulcanizing agent, a vulcanization aid, a co-vulcanizing agent, a vulcanization accelerator, and filler may be mixed with each other.

The mixing temperature may be 20° C. to 200° C., for example. The mixing duration may be 2 to 80 minutes, for example.

Stacking of the unvulcanized fluoroelastomer layer and the fluororesin layer may be achieved by any of a method in which the unvulcanized fluoroelastomer layer and the fluororesin layer are prepared separately and then stacked by, for example, compression; a method in which the unvulcanized fluoroelastomer layer and the fluororesin layer are prepared and stacked simultaneously; and a method in which the fluororesin is applied to the unvulcanized fluoroelastomer layer to form the fluororesin layer.

In the method in which the unvulcanized fluoroelastomer layer and the fluororesin layer are prepared separately and then stacked by, for example, compression, the fluororesin and the fluoroelastomer composition may be molded by the same molding method or by different molding methods.

For the molding of the unvulcanized fluoroelastomer layer, the molded article having any shape such as a sheet or a tube may be prepared by heat compression molding, transfer molding, extrusion molding, injection molding, calender molding, or coating of the fluoroelastomer composition.

The fluororesin layer may be molded by, for example, heat compression molding, melt extrusion molding, injection molding, or coating (including powder coating). The molding may be performed using any molding device usually used for fluororesins, such as an injection molding device, a blow molding device, an extrusion molding device, or any coating device. They can provide a laminate having any shape such as a sheet or a tube. In order to achieve excellent productivity, melt extrusion molding is preferred.

The method in which the unvulcanized fluoroelastomer layer and the fluororesin layer are prepared and stacked simultaneously may be a method in which a fluoroelastomer composition to form the unvulcanized fluoroelastomer layer and a fluororesin (b1) to form the fluororesin layer are molded and stacked simultaneously by a technique such as multilayer compression molding, multilayer transfer molding, multilayer extrusion molding, multilayer injection molding, or doubling. This method enables simultaneous stacking of the unvulcanized fluoroelastomer layer which is an unvulcanized molded article and the fluororesin layer. Thus, the method needs no step of closely bonding the unvulcanized fluoroelastomer layer and the fluororesin layer and is suitable to achieve firm bonding in the following vulcanization. If the close bonding is insufficient, a close-bonding step such as wrapping may be performed.

(Structure of Laminate)

The laminate of the invention may have a bilayer structure of the fluoroelastomer layer (A) and the fluororesin layer (B), may have a structure in which the fluoroelastomer layer (A) is stacked on each side of the fluororesin layer (B), or may have a structure in which the fluororesin layer (B) is stacked on each side of the fluoroelastomer layer (A).

For example, the laminate may have a trilayer structure of fluoroelastomer layer (A)-fluororesin layer (B)-fluoroelastomer layer (A) or of fluororesin layer (B)-fluoroelastomer layer (A)-fluororesin layer (B).

The laminate may have a multilayer structure of three or more layers including a polymer layer (C) other than the fluoroelastomer layer (A) and the fluororesin layer (B) bonded together, or may be a structure including a polymer layer (D) on one or each side of a trilayer structure including a polymer layer (C) other than the fluoroelastomer layer (A) and the fluororesin layer (B) bonded together. The polymer layer (C) and the polymer layer (D) may be the same as or different from each other.

The laminate of the invention may include a polymer layer (C) on one or each side of a trilayer structure of fluoroelastomer layer (A)-fluororesin layer (B)-fluoroelastomer layer (A).

The polymer layers (C) and (D) may be respectively rubber layers (C1) and (D1) other than the fluoroelastomer layer (A). The rubber layers (C1) and (D1) may be respectively non-fluoroelastomer layers (C1a) and (D1a) formed from a non-fluoroelastomer. A non-fluoroelastomer is preferred because it has good cold resistance and excellent cost efficiency. The non-fluoroelastomer layer (C1a) and the non-fluoroelastomer layer (D1a) may be formed from the same non-fluoroelastomer, or may be formed from different non-fluoroelastomers.

The laminate of the invention may include the layers stacked in the order of fluoroelastomer layer (A)-fluororesin layer (B)-non-fluoroelastomer layer (C1a).

The laminate may further include a non-fluoroelastomer layer (D1a) and the layers may be stacked in the order of non-fluoroelastomer layer (D1a)-fluoroelastomer layer (A)-fluororesin layer (B)-non-fluoroelastomer layer (C1a), in the order of fluoroelastomer layer (A)-fluororesin layer (B)-non-fluoroelastomer layer (D1a)-non-fluoroelastomer layer (C1a), or in the order of fluoroelastomer layer (A)-fluororesin layer (B)-non-fluoroelastomer layer (C1a)-non-fluoroelastomer layer (D1a).

Specific examples of the non-fluoroelastomer include diene-based rubber such as acrylonitrile-butadiene rubber (NBR) and hydride thereof (HNBR), styrene-butadiene rubber (SBR), chloroprene rubber (CR), butadiene rubber (BR), natural rubber (NR), and isoprene rubber (IR), ethylene-propylene-termonomer copolymerized rubber, silicone rubber, butyl rubber, epichlorohydrin rubber, acrylic rubber, chlorinated polyethylene (CPE), polyblend of acrylonitrile-butadiene rubber and vinyl chloride (PVC-NBR), ethylene propylene diene rubber (EPDM), and chlorosulfonated polyethylene (CSM). Examples also include rubber obtained by mixing any of these non-fluoroelastomers and fluoroelastomers at any ratio.

In order to achieve good heat resistance, oil resistance, weather resistance, and extrusion moldability, the non-fluoroelastomer is preferably a diene-based rubber or epichlorohydrin rubber. It is more preferably NBR, HNBR, or epichlorohydrin rubber. The rubber layer (C1) is preferably formed from NBR, HNBR, or epichlorohydrin rubber.

In order to achieve good weather resistance and cost efficiency, the rubber layer (D1) is preferably formed from acrylonitrile-butadiene rubber, epichlorohydrin rubber, chlorinated polyethylene (CPE), polyblend of acrylonitrile-butadiene rubber and vinyl chloride (PVC-NBR), ethylene propylene diene rubber (EPDM), acrylic rubber, or a mixture of any of these. The unvulcanized rubber composition to form the rubber layer (C1) or (D1) may also contain a vulcanizing agent and any other compounding agents.

Next, the layer structure of the laminate of the invention is described in more detail below.

(1) Bilayer Structure of Fluoroelastomer Layer (A)-Fluororesin Layer (B)

This is a basic structure. Conventional structures of this type suffer insufficient bonding between the layers (between the fluoroelastomer layer and the fluororesin layer), and thus stacking of the fluororesin layer (B) and the fluoroelastomer layer (A) requires surface treatment on the resin side, application of additional adhesive between the layers, fixing of the layers by wrapping a tape-shaped film therearound, or the like, which causes complication of the process. In the invention, vulcanization leads to vulcanization bonding, so that chemically firm bonding between the layers can be achieved without such a complicated process.

(2) Trilayer Structure of Rubber Layer-Fluororesin Layer (B)-Rubber Layer

Examples of this structure include a trilayer structure of fluoroelastomer layer (A)-fluororesin layer (B)-fluoroelastomer layer (A) and a trilayer structure of fluoroelastomer layer (A)-fluororesin layer (B)-rubber layer (C1).

In the case where the sealability is required, such as joint portions of fuel pipes, the rubber layer is preferably provided on each side of the fluororesin layer so as to secure the sealability. The inner and outer rubber layers may be the same as or different from each other.

In the case of a trilayer structure of fluoroelastomer layer (A)-fluororesin layer (B)-rubber layer (C1), the rubber layer (C1) is preferably a layer formed from acrylonitrile butadiene rubber, hydrogenated acrylonitrile butadiene rubber, epichlorohydrin rubber, or a mixture of acrylonitrile butadiene rubber and acrylic rubber.

In order to improve the chemical resistance and the low fuel permeability, a fuel pipe may have a trilayer structure of fluoroelastomer layer (A)-fluororesin layer (B)-rubber layer (C1) in which a fluoroelastomer layer is disposed as the rubber layer (C1) and the rubber layer (C1) is disposed as an inner layer of the pipe.

(3) Trilayer Structure of Resin Layer-Fluoroelastomer Layer (A)-Resin Layer

An example of this structure is a trilayer structure of fluororesin layer (B)-fluoroelastomer layer (A)-fluororesin layer (B). The inner and outer resin layers may be the same as or different from each other.

(4) Trilayer Structure of Fluororesin Layer (B)-Fluoroelastomer Layer (A)-Rubber Layer (C1)

(5) Structure Including Four or More Layers

In accordance with the purpose, any of the fluoroelastomer layer (A), the rubber layer (C1), and the fluororesin layer (B) may be stacked on any of the trilayer structures (2) to (4). Another layer such as metal foil may be disposed, and an adhesive layer may be disposed between the layers excluding between the fluororubber layer (A) and the fluororesin layer (B).

Further, the polymer layer (C) may be stacked to provide a lined article.

The parameters such as thicknesses and shapes of the respective layers may be appropriately selected in accordance with the purpose and form of use, for example.

In order to improve the pressure resistance, a reinforcing layer of splicing yarn, for example, may be disposed as appropriate.

The laminate of the invention has excellently low fuel permeability, as well as excellent heat resistance, oil resistance, fuel oil resistance, antifreeze resistance, steam resistance, weather resistance, and ozone resistance. Further, the laminate of the invention is sufficiently tolerant of use under severe conditions, and thus can be used in a variety of applications.

For example, the laminate has properties suitable for seals such as gaskets, non-contact or contact packings (e.g., self-seal packings, piston rings, split ring packings, mechanical seals, oil seals), bellows, diaphragms, hoses, tubes, and electric wires, which are required to have heat resistance, oil resistance, fuel oil resistance, antifreeze resistance, and steam resistance, of engine bodies, main drive systems, valve train systems, lubrication and cooling systems, fuel systems, and intake and exhaust systems of automobile engines, transmission systems of driveline systems, steering systems and braking systems of chassis, and basic electrical parts of electrical equipment, electrical parts of control systems, and electrical equipment accessories.

Specifically, the laminate can be used in the following applications:

gaskets such as cylinder head gaskets, cylinder head cover gaskets, sump packings, and general gaskets, seals such as O-rings, packings, and timing belt cover gaskets, and hoses such as control hoses, of engine bodies, anti-vibration rubber of engine mounts, and sealants for high-pressure valves in hydrogen storage systems;

shaft seals such as crankshaft seals and camshaft seals of main drive systems;

valve stem seals such as engine valves of valve train systems;

engine oil cooler hoses of engine oil coolers, oil return hoses, seal gaskets, water hoses used around radiators, and vacuum pump oil hoses of vacuum pumps, of lubrication and cooling systems;

oil seals, diaphragms, and valves of fuel pumps, fuel hoses such as filler (neck) hoses, fuel supply hoses, fuel return hoses, and vapor (evaporator) hoses, in-tank hoses, filler seals, tank packings, and in-tank fuel pump mounts of fuel tanks, tube bodies and connector O-rings of fuel pipe tubes, injector cushion rings, injector seal rings, injector O-rings, pressure regulator diaphragms, and check valves of fuel injection systems, needle valve petals, accelerator pump pistons, flange gaskets, and control hoses of carburetors, and valve seats and diaphragms of combined air controlling (CAC) systems in fuel systems; in particular, suitable for fuel hoses and in-tank hoses of fuel tanks;

intake manifold packings and exhaust manifold packings of manifolds, diaphragms, control hoses, and emission control hoses of exhaust gas recirculation (EGR) systems, diaphragms of BPT, after burn preventive valve seats of AB valves, throttle body packings of throttles, turbo oil hoses (supply), turbo oil hoses (return), turbo air hoses, intercooler hoses, and turbine shaft seals of turbochargers, of intake and exhaust systems;

transmission-related bearing seals, oil seals, O-rings, packings, and torque converter hoses, and gear oil hoses, ATF hoses, O-rings, and packings of ATs, of transmission systems;

power steering oil hoses of steering systems;

oil seals, O-rings, packings, brake fluid hoses, air valves, vacuum valves, and diaphragms of vacuum servos, piston cups (rubber cups) of master cylinders, caliper seals, and boots, of braking systems;

insulators and sheaths of electric wires (harnesses), and tubes of harness-holding parts of basic electrical parts;

cover materials for sensor lines of control system electrical parts; and

O-rings, packings, and air conditioner hoses of electrical equipment accessories, and wiper blades of exterior parts.

In addition to the field of automobiles, for example, the laminate of the invention can be suitably used in the following applications: oil-resistant, chemical-resistant, heat-resistant, steam-resistant, or weather-resistant packings, O-rings, hoses, other sealants, diaphragms, and valves in a means of transportation, such as shipment and aircraft; similar packings, O-rings, sealants, diaphragms, valves, hoses, rolls, tubes, chemical-resistant coatings, and linings in chemical plants; hoses and gaskets in the chemical treatment field; similar packings, O-rings, hoses, sealants, belts, diaphragms, valves, rolls, and tubes in food plant equipment and food-related devices (including household utensils); similar packings, O-rings, hoses, sealants, diaphragms, valves, and tubes in nuclear power plant equipment; similar packings, O-rings, hoses, sealants, diaphragms, valves, rolls, tubes, linings, mandrels, electric wires, expansion joints, belts, rubber plates, and weather strips in OA equipment and general industrial parts; and roll blades of plain paper copiers. For example, back-up rubber materials of PTFE diaphragms are poor in slidability, and thus are worn down or broken during use. In contrast, the laminate of the invention can solve such problems, and thus is suitably used.

In the case of food-related rubber sealants, conventional rubber sealants cause problems such as scent absorption and contamination of foods by rubber chips. In contrast, the laminate of the invention can solve such problems, and thus is suitably used. In the case of medical and chemical applications, rubber materials used as sealants for pipes using rubber sealant solvents disadvantageously swell by such solvents. In contrast, the laminate of the invention can solve such problems because the rubber is covered with resin. In general industrial fields, the laminate can be suitably used for rubber rolls, O-rings, packings, and sealants in order to improve the strength, slidability, chemical resistance, and permeability of rubber materials. In particular, the laminate can be suitably used for packing of lithium ion batteries because the laminate maintains the chemical resistance and the sealability simultaneously. Further, the laminate can be suitably used in applications requiring slidability with low friction.

In the case of the medical applications, the laminate of the invention can be suitably used in the following applications: drug closures, bottle cap seals, can seals, medicinal tapes, medicinal pads, syringe packings, bases for percutaneous absorption drugs, teats of baby bottles, medical bags, catheters, infusion sets, coinjection tubes, cap liners, caps of vacuum blood collection tubes, cyringe gaskets, infusion tubes, gaskets and caps of medical equipment, syringe tips, grommets, caps of blood collection tubes, cap seals, packings, O-rings, sheath introducers, dilator, guiding sheaths, blood circuits, cardiopulmonary bypass circuits, tubes for rotablators, catheter needles, infusion sets, infusion tubes, needleless infusion systems, infusion bags, blood bags, blood component separation bags, tubes for blood component separation bags, artificial blood vessels, arterial cannulae, stents, protective tubes for endoscope treatment devices, scope tubes for endoscopes, top overtubes for endoscopes, guiding tubes for pharyngeal transit, tubes for coronary artery bypass graft surgery, ileus tubes, tubes for percutaneous transhepatic biliary drainage, outer tubes for electrosurgical knives, outer tubes for ultrasonic scalpels, outer tubes for dissecting forceps, and bags for cell culture.

Examples of the molded articles for offshore uses to which the laminate of the invention may be applied include tubes and hoses for offshore oil fields (including injection tubes and crude oil transport tubes).

The laminate of the invention is particularly preferably used for tubes and hoses among these. In other words, the laminate is preferably a tube or a hose. The laminate can suitably be used as a fuel pipe tube or hose of automobiles among the tubes owing to its heat resistance and low fuel permeability.

Fuel pipes formed from the laminate of the invention can be produced by any usual method.

EXAMPLES

The invention is described in more detail hereinbelow with reference to examples. Still, the invention is not intended to be limited by these examples.

In the examples and comparative examples, the physical properties were determined by the following methods.

(1) Composition of Polymer

The composition of the polymer was determined by $^{19}$F-NMR analysis.

(2) Melting Point

The melting peak with a temperature-increasing rate of 10° C./min was recorded using a DSC device available from Seiko Instruments Inc., and the temperature corresponding to the maximum value was defined as the melting point.

(3) Melt Flow Rate (MFR)

For each of the fluororesins shown in Table 1, the weight (g) of the polymer that flowed out of a nozzle having a diameter of 2 mm and a length of 8 mm per unit time (10 minutes) was determined at 297° C. under a load of 5 kg using a melt indexer (available from Toyo Seiki Seisaku-sho, Ltd.).

For low molecular weight PTFE, the weight (g) of the polymer that flowed out of a nozzle having a diameter of 2 mm and a length of 8 mm per unit time (10 minutes) was determined at 372° C. under a load of 1.2 kg using a melt indexer (available from Toyo Seiki Seisaku-sho, Ltd.).

(4) Fuel Permeability Coefficient

Pellets of each fluororesin were put into a mold having a diameter of 120 mm. The workpiece was mounted on a press heated up to 300° C. and the pellets were melt-pressed at a pressure of about 2.9 MPa, whereby a fluororesin sheet having a thickness of 0.12 mm was obtained. This sheet was put into a SUS316 fuel permeability coefficient measurement cup having an inner diameter of 40 mmφ and a height of 20 mm. Here, the cup contained 18 mL of CE10 (fuel prepared by mixing a mixture of isooctane and toluene at a ratio by volume of 50:50 and 10 vol % of ethanol). The mass change at 60° C. was determined for 1000 hours. The fuel permeability coefficient (g·mm/m²/day) was calculated from the mass change per hour (the period during which the mass change is constant at the initial stage of the measurement), and the surface area and thickness of the sheet at the liquid-contact portion.

(5) Average Particle Size of Low Molecular Weight PTFE

The average particle size was determined as follows. That is, the particle size distribution was determined using a laser diffraction particle size distribution analyzer (available from Japan Laser Corp.) at a pressure of 0.1 MPa and a measurement time of 3 seconds without cascade impaction. The value corresponding to 50% of the cumulative volume in the resulting particle size distribution was taken as the average particle size.

(6) Adhesiveness

The laminate obtained was cut into three strips having a width of 10 mm and a length of 40 mm. The fluororesin sheet was peeled off to provide a margin for holding. Whereby, test pieces were prepared. For each of these test pieces, in order to determine the bond strength of the bonded surface alone without the bond strength of the interface between the fluoroelastomer layer and the fluororesin layer, the interface between the fluoroelastomer layer and the fluororesin layer was slowly stretched by hand once to increase the grip section by 2 to 3 mm. Then, the test piece was subjected to a peeling test at 25° C. and a tensile rate of 50 ram/min using an autograph (AGS-J 5 kN, available from Shimadzu Corp.) in conformity with JIS K 6256 (Determination of adhesion strength for vulcanized rubber). Whereby, the bond strength was determined and the average value of data (N=3) was calculated. Also, the mode of peeling was observed and evaluated by the following criteria.

Excellent: The fluoroelastomer composition or the fluororesin suffered material failure at the interface of the laminate, which means the layers were not separated at the interface.

Good: The layers partially suffered material failure, and the peeling strength at the interface of the laminate was 7 N/cm or higher.

Poor: The layers of the laminate were easily separated at the interface of the laminate.

The materials used in the examples and the comparative examples are listed below.

TABLE 1

|  | Composition (mol %) | Melting point (° C.) | MFR (g/10 min) | Fuel permeability coefficient (g · mm/m$^2$/day) | Sheet thickness (μm) |
|---|---|---|---|---|---|
| Fluororesin (1) | CTFE/TFE/PPVE copolymer 21.3/76.3/2.4 | 248 | 29.2 | 0.4 | 120 |
| Fluororesin (2) | CTFE/TFE/PPVE copolymer 21.2/76.1/2.7 | 245 | 13.6 | 0.4 | 120 |

Fluoroelastomer (1): Dai-El G902, available from Daikin Industries, Ltd.

Fluoroelastomer (2): Dai-El G802, available from Daikin Industries, Ltd.

Carbon black: Thermax N-990, available from Cancarb Ltd.

Vulcanization aid: triallyl isocyanurate (TAIL), available from Nihon Kasei Co., Ltd.

Vulcanizing agent: peroxide-vulcanizing agent, Perhexa 25B, available from NOF Corp.

Phosphine (1): 1,2-bis(diphenylphosphino)ethane, available from Tokyo Chemical Industry Co., Ltd.

Phosphine (2): chlorodiphenyl phosphine, available from Tokyo Chemical Industry Co., Ltd.

Phosphine (3): tris-2,6-dimethoxyphenyl phosphine, available from Tokyo Chemical Industry Co., Ltd.

Phosphine (4): triphenyl phosphine, available from Tokyo Chemical Industry Co., Ltd.

Phosphonium salt (5): tributyl(cyanomethyl)phosphonium chloride, available from Tokyo Chemical Industry Co., Ltd.

Basic multifunctional compound: N,N'-dicinnamylidene-1,6-hexamethylenediamine (V-3, available from Daikin Industries, Ltd.)

TABLE 2

|  | Composition (mass %) | MFR (g/10 min) | Average particle size (μm) |
|---|---|---|---|
| Low molecular weight PTFE (A) | TFE/HFP copolymer 99.86/0.14 | 1.37 | 5.5 |
| Low molecular weight PTFE (B) | TFE homopolymer 100 | 0.91 | 3.4 |
| Low molecular weight PTFE (C) | TFE/HFP copolymer 99.86/0.14 | 1.30 | 7.2 |

Examples and Comparative Examples (Production of Fluororesin Sheet)

With a spacer placed so as to allow the resulting sheet to have a thickness of 120 μm (0.12 mm), the fluororesin shown in Table 1 was pressed at 280° C. for 10 minutes. Thereby, a fluororesin sheet was obtained.

(Production of Fluoroelastomer Sheet (Fluoroelastomer Composition))

The materials shown in Table 3 or 4 were kneaded using an 8-inch open roll. Thereby, a sheet-shaped fluoroelastomer composition (fluoroelastomer sheet) having a thickness of about 3 mm was obtained.

For the fluoroelastomer composition, the maximum torque (MH) and the minimum torque (ML) at 170° C. were determined using a type II curelastometer (Model: JSR Curelastometer available from JSR Corp.), and then the induction time (T10) and the optimum vulcanizing time (T90) were determined. The measurement results are shown in Table 3. T10 means the time at which {(MH)−(ML)}×0.1+ML equals to the value in the table; T90 means the time at which {(MH)−(ML)}×0.9+ML equals to the value in the table; and MH and ML are values determined in conformity with JIS K 6300-2.

(Production of Laminate)

The fluoroelastomer sheet having a thickness of about 3 mm and the fluororesin sheet having a thickness of about 0.12 mm were stacked, and a fluororesin film (thickness: 10 μm) having a width of about 50 mm was inserted between the sheets at an end of the stack. The resulting stack was pressed at a press pressure of 300 kgf/cm$^2$ and at 170° C. for 45 minutes, whereby a sheet-shaped laminate was obtained. The results are shown in Table 3 and Table 4.

TABLE 3

| Component (parts by mass) | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Fluoroelastomer (1) | 100.0 | 100.0 | 100.0 | 100.0 | 100.0 | 100.0 | 100.0 |
| Fluoroelastomer (2) | | | | | | | |
| Carbon black | 20.0 | 20.0 | 20.0 | 20.0 | 20.0 | 20.0 | 20.0 |
| Vulcanization aid | 7.0 | 7.0 | 7.0 | 10.0 | 7.0 | 7.0 | 3.0 |
| Vulcanizing agent | 1.5 | 1.5 | 1.5 | 1.5 | 1.5 | 1.5 | 1.5 |
| Phosphine (1) | 0.5 | 0.5 | 0.5 | 0.5 | | 2.0 | |
| Phosphine (2) | | | | | | | |
| Phosphine (3) | | | | | | | |
| Phosphine (4) | | | | | | | |
| Phosphonium salt (5) | | | | | | | |
| Low molecular weight PTFE (A) | 30.0 | 45.0 | 60.0 | 45.0 | 30.0 | 30.0 | |
| Low molecular weight PTFE (B) | | | | | | | |
| Low molecular weight PTFE (C) | | | | | | | |
| Basic multifunctional compound | | | | | | | 3.0 |
| Sum | 159.0 | 174.0 | 189.0 | 177.0 | 158.5 | 160.5 | 127.5 |
| ML (N) | 5.5 | 4.2 | 5.3 | 2.8 | 3.3 | 3.3 | 1.6 |
| MH (N) | 55 or higher | 55 or higher | 55 or higher | 55 or higher | 55 or higher | 51.2 | 39.2 |
| T10 (min) | — | — | — | — | — | 0.6 | 1.4 |
| T90 (min) | — | — | — | — | — | 5.6 | 2.6 |
| Results of peeling Fluororesin (1) | Poor | Poor | Poor | Poor | Poor | Poor | Poor |
| Bond strength (N/cm) | 2 | 1 | 2 | 1 | 1 | 3 | 5 |
| Results of peeling Fluororesin (2) | — | — | — | — | — | — | — |
| Bond strength (N/cm) | | | | | | | |

TABLE 4

| Component (parts by mass) | Example 1 | Example 2 | Example 3 | Example 4 | Example 5 | Example 6 | Example 7 | Example 8 | Example 9 | Example 10 |
|---|---|---|---|---|---|---|---|---|---|---|
| Fluoroelastomer (1) | 100.0 | 100.0 | 100.0 | 100.0 | 100.0 | 100.0 | 100.0 | 100.0 | 100.0 | 100.0 |
| Fluoroelastomer (2) | | | | | | | | | | |
| Carbon black | 20.0 | 20.0 | 20.0 | 20.0 | 20.0 | 20.0 | 20.0 | 20.0 | 20.0 | 20.0 |
| Vulcanization aid | 3.0 | 3.0 | 3.0 | 7.0 | 7.0 | 7.0 | 7.0 | 7.0 | 7.0 | 7.0 |
| Vulcanizing agent | 1.5 | 1.5 | 1.5 | 1.5 | 1.5 | 1.5 | 1.5 | 1.5 | 1.5 | 1.5 |
| Phosphine (1) | 0.5 | | | | 0.5 | 0.5 | 0.5 | 0.5 | 0.5 | |
| Phosphine (2) | | 0.5 | | | | | | | | 0.5 |
| Phosphine (3) | | | 0.5 | | | | | | | |
| Phosphine (4) | | | | | | | | | | |
| Phosphonium salt (5) | | | | | | | | | | |
| Low molecular weight PTFE (A) | | | | 30.0 | 30.0 | 45.0 | 60.0 | | | 30.0 |
| Low molecular weight PTFE (B) | | | | | | | | 30.0 | | |
| Low molecular weight PTFE (C) | | | | | | | | | 30.0 | |
| Basic multifunctional compound | 3.0 | 3.0 | 3.0 | 3.0 | 3.0 | 3.0 | 3.0 | 3.0 | 3.0 | 3.0 |
| Sum | 128.0 | 128.0 | 128.0 | 161.5 | 162.0 | 177.0 | 192.0 | 162.0 | 162.0 | 162.0 |
| ML (N) | 1.6 | 2.0 | 1.6 | 2.2 | 2.5 | 2.4 | 4.2 | 2.5 | 3.3 | 1.9 |
| MH (N) | 33.7 | 35.8 | 32.2 | 39.6 | 37.5 | 44.2 | 47.0 | 36.6 | 39.9 | 31.9 |
| T10 (min) | 1.3 | 0.8 | 1.2 | 1.3 | 1.1 | 1.1 | 1.2 | 1.2 | 1.3 | 1.0 |
| T90 (min) | 2.7 | 2.4 | 2.7 | 3.8 | 3.4 | 4.1 | 4.4 | 3.8 | 4.4 | 2.8 |
| Results of peeling Fluororesin (1) | Good | Good | Good | Good | Excellent | Excellent | Excellent | Excellent | Excellent | Excellent |
| Bond strength (N/cm) | 7 | 7 | 7 | 8 | 17 | 16 | 11 | 11 | 15 | 18 |
| Results of peeling Fluororesin (2) | — | — | — | — | Excellent | — | — | — | — | — |
| Bond strength (N/cm) | | | | | 17 | | | | | |

| Component (parts by mass) | Example 11 | Example 12 | Example 13 | Example 14 | Example 15 | Example 16 | Example 17 | Example 18 | Example 19 | Example 20 |
|---|---|---|---|---|---|---|---|---|---|---|
| Fluoroelastomer (1) | 100.0 | 100.0 | 100.0 | 100.0 | | 100.0 | 100.0 | 100.0 | 100.0 | 100.0 |
| Fluoroelastomer (2) | | | | | 100.0 | | | | | |
| Carbon black | 20.0 | 20.0 | 20.0 | 20.0 | 20.0 | 20.0 | 20.0 | 20.0 | 20.0 | 20.0 |
| Vulcanization aid | 7.0 | 5.0 | 7.0 | 7.0 | 7.0 | 5.0 | 3.0 | 7.0 | 3.0 | 3.0 |
| Vulcanizing agent | 1.5 | 1.5 | 1.5 | 1.5 | 1.5 | 1.5 | 1.5 | 1.5 | 1.5 | 1.5 |
| Phosphine (1) | | 0.5 | 2.0 | | | 0.5 | 0.5 | | | |

TABLE 4-continued

|  |  |  |  |  |  |  |  |  |  |  |
|---|---|---|---|---|---|---|---|---|---|---|
| Phosphine (2) |  |  |  | 2.0 | 0.5 |  |  |  | 0.25 | 0.25 |
| Phosphine (3) | 0.5 |  |  |  |  |  |  |  |  |  |
| Phosphine (4) |  | 0.5 |  |  |  |  |  |  |  |  |
| Phosphonium salt (5) |  |  |  |  |  |  |  | 0.5 |  |  |
| Low molecular weight PTFE (A) | 30.0 | 30.0 | 30.0 | 30.0 | 30.0 | 30.0 | 30.0 | 30.0 | 30.0 | 30.0 |
| Low molecular weight PTFE (B) |  |  |  |  |  |  |  |  |  |  |
| Low molecular weight PTFE (C) |  |  |  |  |  |  |  |  |  |  |
| Basic multifunctional compound | 3.0 | 3.0 | 3.0 | 3.0 | 3.0 | 3.0 | 3.0 | 3.0 | 4.0 | 6.0 |
| Sum | 162.0 | 160.5 | 163.5 | 163.5 | 162.0 | 160.0 | 158.0 | 162.0 | 158.8 | 160.8 |
| ML (N) | 1.6 | 2.3 | 2.3 | 2.2 | 2.5 | 2.5 | 2.4 | 2.2 | 2.8 | 2.6 |
| MH (N) | 34.9 | 31.1 | 31.4 | 43.2 | 29.2 | 31.7 | 29.3 | 36.8 | 36.1 | 35.7 |
| T10 (min) | 1.2 | 1.2 | 1.2 | 0.7 | 1.1 | 1.2 | 1.1 | 1.0 | 1.1 | 1.2 |
| T90 (min) | 3.3 | 4.4 | 5.2 | 1.5 | 2.8 | 3.8 | 3.2 | 2.8 | 3.1 | 3.2 |
| Results of peeling Fluororesin (1) | Excellent | Excellent | Excellent | Excellent | Excellent | Excellent | Excellent | Excellent | Excellent | Excellent |
| Bond strength (N/cm) | 11 | 12 | 15 | 16 | 11 | 12 | 13 | 14 | 17 | 10 |
| Results of peeling Fluororesin (2) | — | — | — | — | — | — | — | — | — | — |
| Bond strength (N/cm) |  |  |  |  |  |  |  |  |  |  |

The invention claimed is:

1. A laminate comprising:
a fluoroelastomer layer (A); and
a fluororesin layer (B) stacked on the fluoroelastomer layer (A),
the fluoroelastomer layer (A) being a layer formed from a fluoroelastomer composition,
the fluoroelastomer composition containing a fluoroelastomer, a basic multifunctional compound, and at least one compound (a) comprising a fluororesin (a1) and a phosphorus compound (a2),
the fluororesin (a1) being at least one selected from the group consisting of non-melt processible polytetrafluoroethylene, low molecular weight polytetrafluoroethylene, a tetrafluoroethylene/perfluoro(alkyl vinyl ether) copolymer, a tetrafluoroethylene/hexafluoropropylene copolymer, an ethylene/tetrafluoroethylene copolymer, an ethylene/tetrafluoroethylene/hexafluoropropylene copolymer, polychlorotrifluoroethylene, a chlorotrifluoroethylene/tetrafluoroethylene copolymer, an ethylene/chlorotrifluoroethylene copolymer, polyvinyl fluoride, and a fluoromonomer/vinyl ester copolymer, the phosphorus compound (a2) being at least one selected from the group consisting of a phosphine oxide, and a phosphine compound represented by $PR_3$, wherein three Rs are the same as or different from each other, and are each a halogen atom or an organic group, and at least one R is a halogen atom or a C1-C30 hydrocarbon group containing a substituent wherein the substituent is at least one selected from the group consisting of an alkoxy group, an amino group, a cyano group, an aldehyde group, a carboxylic acid group, a halogen atom, a phosphino group, a phosphono group, and a diphenylphosphino group,
the compound (a) being present in an amount of 0.01 to 120 parts by mass relative to 100 parts by mass of the fluoroelastomer,
the fluororesin layer (B) being formed from a fluororesin (b1) having a fuel permeability coefficient of 2.0 g·mm/m²/day or lower.

2. The laminate according to claim 1,
wherein the phosphorus compound (a2) is the phosphine compound represented by $PR_3$.

3. The laminate according to claim 1,
wherein the fluoroelastomer composition further contains a peroxide-vulcanizing agent.

4. The laminate according to claim 1,
wherein the fluororesin (b1) is at least one selected from the group consisting of polychlorotrifluoroethylene, a chlorotrifluoroethylene copolymer, and a tetrafluoroethylene/hexafluoropropylene/vinylidene fluoride copolymer.

5. The laminate according to claim 1,
wherein the fluoroelastomer layer (A) is stacked on each side of the fluororesin layer (B).

6. The laminate according to claim 1,
wherein the fluororesin layer (B) is stacked on each side of the fluoroelastomer layer (A).

7. The laminate according to claim 1, further comprising a non-fluoroelastomer layer (C1a),
wherein the layers are stacked in the order of the fluoroelastomer layer (A), the fluororesin layer (B), and the non-fluoroelastomer layer (C1a).

8. The laminate according to claim 7, further comprising a non-fluoroelastomer layer (D1a),
wherein the layers are stacked in the order of:
the non-fluoroelastomer layer (D1a), the fluoroelastomer layer (A), the fluororesin layer (B), and the non-fluoroelastomer layer (C1a);
the fluoroelastomer layer (A), the fluororesin layer (B), the non-fluoroelastomer layer (D1a), and the non-fluoroelastomer layer (C1a); or
the fluoroelastomer layer (A), the fluororesin layer (B), the non-fluoroelastomer layer (C1a), and the non-fluoroelastomer layer (D1a).

9. The laminate according to claim 1,
wherein the fluoroelastomer layer (A) and the fluororesin layer (B) are vulcanization-bonded to each other.

* * * * *